United States Patent
Araki et al.

(10) Patent No.: US 7,220,809 B1
(45) Date of Patent: May 22, 2007

(54) OPTICAL MATERIAL CONTAINING FLUORINE-CONTAINING POLYMER HAVING FUNCTIONAL GROUP

(75) Inventors: Takayuki Araki, Settsu (JP); Yoshito Tanaka, Settsu (JP); Yuzo Komatsu, Settsu (JP); Yoshito Ando, Settsu (JP)

(73) Assignee: Daikin industries, Ltd., Osaka (JP)

( * ) Notice: Subject to any disclaimer, the term of this patent is extended or adjusted under 35 U.S.C. 154(b) by 344 days.

(21) Appl. No.: 10/654,888

(22) Filed: Sep. 5, 2003

Related U.S. Application Data

(63) Continuation-in-part of application No. PCT/JP02/02057, filed on Mar. 6, 2002.

(30) Foreign Application Priority Data

Mar. 8, 2001 (JP) .............................. 2001-064771

(51) Int. Cl.
*C08F 16/24* (2006.01)
(52) U.S. Cl. ...................... 526/247; 526/240; 526/244; 526/245; 436/73
(58) Field of Classification Search ................ 526/247, 526/240, 244, 245
See application file for complete search history.

(56) References Cited

U.S. PATENT DOCUMENTS

| | | | | |
|---|---|---|---|---|
| 5,581,398 A | * | 12/1996 | van Veggel et al. | 359/342 |
| 6,176,895 B1 | * | 1/2001 | DeSimone et al. | 75/723 |
| 6,292,292 B1 | * | 9/2001 | Garito et al. | 359/341.5 |
| 6,306,975 B1 | * | 10/2001 | Zhao et al. | 525/276 |
| 6,869,693 B2 | * | 3/2005 | Fryd et al. | 428/690 |
| 2004/0047060 A1 | * | 3/2004 | Araki et al. | 359/883 |

FOREIGN PATENT DOCUMENTS

| | | | |
|---|---|---|---|
| EP | 0 622 878 A1 | | 11/1994 |
| EP | 622878 A1 | * | 11/1994 |
| EP | 1 072 905 A1 | | 1/2001 |
| EP | 1072905 A1 | * | 1/2001 |
| EP | 1375598 A1 | * | 1/2004 |

(Continued)

OTHER PUBLICATIONS

International Search Report for PCT/JP02/02057 dated Jun. 11, 2002.

(Continued)

*Primary Examiner*—David W. Wu
*Assistant Examiner*—Henry S. Hu
(74) *Attorney, Agent, or Firm*—Sughrue Mion, PLLC

(57) ABSTRACT

There is provided an optical material obtained from an organic composition which is suitable for an optical material in optical communication and comprises a fluorine-containing polymer having functional group and a rare earth metal ion, in which the fluorine-containing polymer having functional group has at least one ketone structure in its side chain and a maximum absorption coefficient of not more than 1 $cm^{-1}$ in each wavelength range of from 1,290 to 1,320 nm, from 1,530 to 1,570 nm and from 600 to 900 nm and the rare earth metal ion is at least one selected from the group consisting of erbium (Er) ion, thulium (Tm) ion, praseodymium (Pr) ion, holmium (Ho) ion, neodymium (Nd) ion, europium (Eu) ion, dysprosium (Dy) ion, samarium (Sm) ion and cerium (Ce) ion.

10 Claims, 1 Drawing Sheet

FOREIGN PATENT DOCUMENTS

| | | | |
|---|---|---|---|
| EP | 1498459 A1 * | 1/2005 |
| JP | 3-259103 A | 11/1991 |
| JP | 05/088026 A * | 4/1993 |
| JP | 7-502731 A | 3/1995 |
| JP | 63-56610 A | 3/1998 |
| JP | 2000/063682 A * | 2/2000 |
| JP | 2001-91758 A | 4/2001 |
| JP | 2001-226313 A | 8/2001 |
| WO | WO-02/31896 A2 * | 4/2002 |

OTHER PUBLICATIONS

English language translation of International Preliminary Examination Report for PCT/JP02/02057 dated Mar. 4, 2003.

Taiwan Office Action for Application No. 091104367 dated Jan. 12, 2004.

Supplementary European Search Report for EP 02 70 2753 dated Apr. 23, 2004.

* cited by examiner

OPTICAL MATERIAL CONTAINING FLUORINE-CONTAINING POLYMER HAVING FUNCTIONAL GROUP

CROSS-REFERENCE TO RELATED APPLICATION

This is a continuation-in-part of PCT international application No. PCT/JP02/02057 filed on Mar. 6, 2002 pending.

BACKGROUND OF THE INVENTION

The present invention relates to optical materials containing a fluorine-containing polymer having functional group, and particularly relates to compositions useful as an optical material and to materials used suitably in the field of optical communication where optical amplification technology is used and in the field where luminescence phenomenon is used.

An optical communication system using an optical fiber network enables high speed transmission of a large amount of data. Generally a quartz optical fiber is used as the optical fiber. However recently in plastic optical fiber (POF), a POF called GI (graded index) type POF which has a wide band (400 Mbps for 100 m transmission) and assures a low transmission loss has been developed, and construction of an optical communication network for domestic use is also considered. In the respective fibers, there is a difference in a band width of light for transmission. In the quartz fiber, 1,300 nm band and 1,500 nm band are mainly used, and in the plastic (acryl) fiber, 650 nm band is mainly used.

In either of quartz optical fiber and plastic optical fiber, in an optical communication system, there arises an attenuation of an optical signal due to a loss caused at the time of transmission, branching, connection and switching. An attenuation of an optical signal is a problem particularly in case of a long distance transmission. Therefore an optical amplifier is needed to compensate for the attenuation of optical signals.

Example of an optical amplifier for an optical communication system using quartz optical fiber network is, for instance, a so-called fiber type optical amplifier disclosed in the bulletin ("Light amplification with Er-doped optical fiber and application thereof", by Masataka Nakazawa, Applied Physics Vol. 59, No. 9, pp. 1175–1192 (1990)). On this device are applied pumping of electron in Erbium (Er) cation atom by visible or near infrared light and a phenomenon of generating fluorescence having a wavelength of about 1,500 nm band.

On the other hand, a luminant has been put into practical use for an inorganic glass containing a rare earth metal ion and for an electronic device for laser beam. However a present situation is such that because of difficulty in production and processing, applications thereof are limited. Also though a polymer composition is disclosed in JP64-26583A, intensity of luminescence is low.

However in case of an optical amplifier (EDFA) using Er-doped optical fiber, a 20 to 30 m long optical fiber for amplification is necessary to obtain an amplifying gain of 30 dB (1000 times). The reason for this is that for example, while a fiber type optical amplifier for 1,550 nm band uses an erbium ion ($Er^{3+}$)-doped quartz fiber, if a doping amount is increased, a cluster is formed due to association of doping ions and the amplifying action is lowered. Therefore the doping amount is decreased to 10 to 1,000 ppm and a fiber length is increased to obtain an amplifying action. As mentioned above, in case of a fiber type optical amplifier (glass), there is a limit in shortening a length of interface of the optical amplifier. Namely, there is a limit in down-sizing and cost reduction of the optical amplifier.

Also since a base material is inorganic glass, elasticity and mold-processability have not always been satisfactory.

Further in case of a fiber type optical amplifier (glass), it is difficult to make a flat optical amplifier. This causes a problem when an optical integrated circuit is made using an optical amplifier and other optical devices.

Also in case of an inorganic device as a ruminant, because of difficulty in production and processing, applications thereof are limited.

On the other hand, addition of cation of rare earth metal to an organic high molecular weight material has been studied. For example, JP5-86189A discloses polysiloxane in which a rare earth metal ion obtained by using chlorosilane having an organic group and a chloride of rare earth element as starting materials is introduced to a high molecular chain. Also JP5-88026A discloses materials such as polyacrylate and polysiloxane containing a complex such as acetylacetone complex of rare earth metal ion which is excellent in solubility in an organic solvent and oxidation resistance. Further in the preprint of High Molecule Society, Vol. 43(1), 29 (1994), a material obtained by synthesizing a rare earth element cation salt of a polymerizable organic acid such as acrylic acid or methacrylic acid and polymerizing or copolymerizing such a monomer carrying a rare earth cation is reported, in which a cation concentration can be increased to about 10% by weight. By those methods, a rare earth element cation can be added in a high concentration to an organic high molecular weight material excellent in mold processability. However there are disadvantages that the synthesizing process is complicated and may give rise to an economical restriction in industrial application and resins to be used are limited to those having relatively low heat resistance.

Also in order to enhance dispersibility of a rare earth metal ion in a resin, it is necessary that carboxylic acid groups are introduced in a high concentration to a structure of a polymer constituting an acrylic resin. However such an acrylic resin has a large water absorption and therefore cannot be practically used as an optical material which hates presence of water.

Further heat resistance is not sufficient and during a step for producing an optical amplifier or during use thereof, lowering of amplifying characteristics arises.

Also when light source having a wavelength band of 1,300 nm and 1,500 nm is used, there is a substantial disadvantage that transmission of light is lowered since a carbon-hydrogen bond and oxygen-hydrogen bond in the organic material absorb light of such bands. Therefore studies have been made with respect to replacement of hydrogen with heavy hydrogen (D) or fluorine. As a result, transparency can be improved to a certain extent, but in case of the replacement with heavy hydrogen, water absorption of the material does not change, and in case of the replacement with fluorine, when the replacement is made to an extent of having an effect on transparency, there are disadvantages that dispersibility of a rare earth metal ion is significantly lowered and also solubility in a solvent is lowered. Also in case of the replacement with fluorine, a glass transition temperature is not increased and the problem with heat resistance cannot be solved. Further for application on a luminant using luminous phenomenon, there is a problem with light resistance of a polymer to be used.

As mentioned above, all the problems in the fields of optical amplification material and light emission material have not been solved, and novel optical amplification material and light emission material which can solve those problems are desired.

SUMMARY OF THE INVENTION

The present inventors have made intensive studies to solve the mentioned problems and as a result, have found a novel fluorine-containing polymer having functional group which has a ketone structure in its side chain and have found that high performance optical materials, namely optical amplification material and light emission material can be obtained by a combination of the fluorine-containing polymer having functional group and a rare earth ion and particularly a combination of a specific fluorine-containing polymer having a ketone structure at an end of its side chain and a rare earth metal ion is useful for optical materials, namely optical amplification material and light emission material.

The present inventors have completed the present invention based on those findings.

The present invention relates to a fluorine-containing resin composition which is used for optical materials, namely optical amplification material and light emission material and comprises (I) a fluorine-containing polymer having functional group and (II) a rare earth metal ion, in which the fluorine-containing polymer (I) having functional group is a fluorine-containing polymer represented by the formula (1):

  (1)

in which the structural unit M is a structural unit derived from a fluorine-containing ethylenic monomer and represented by the formula (2):

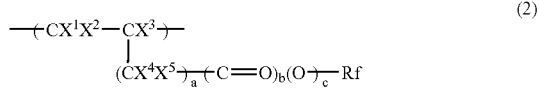  (2)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is a fluorine-containing alkylene group having 1 to 5>C=O units and 1 to 50 carbon atoms excluding carbon atoms of >C=O units or a fluorine-containing alkylene group having ether bond which has 1 to 5>C=O units and 2 to 100 carbon atoms excluding carbon atoms of >C=O units; a is 0 or an integer of from 1 to 3; b and c are the same or different and each is 0 or 1, the structural unit A is a structural unit derived from monomer copolymerizable with the structural unit M, and the structural unit M and the structural unit A are contained in amounts of from 0.1 to 100% by mole and from 0 to 99.9% by mole, respectively. The optical materials, namely optical amplification material and light emission material according to the present invention have functional group, and therefore irrespective of a high fluorine content thereof, are excellent in dispersibility of the rare earth metal ion, light resistance and heat resistance and have a high amplification ratio and a high intensity of luminescence. Also since a refractive index of the optical materials is low, characteristics thereof as a light emitter are enhanced.

The fluorine-containing polymer (I) having functional group may be a fluorine-containing polymer having a moiety represented by the formula (10):

  (10)

wherein $X^{30}$ is H or D (heavy hydrogen); $X^{31}$ is H, D, halogen atom, a hydrocarbon group having 1 to 20 carbon atoms or a hydrocarbon group having 1 to 20 carbon atoms in which a part or all of hydrogen atoms are replaced with heavy hydrogens or halogen atoms; $Rf^{30}$ is a fluorine-containing alkylene group having 1 to 48 carbon atoms or a fluorine-containing alkylene group having 2 to 98 carbon atoms and ether bond; $Rf^{31}$ is a fluorine-containing alkyl group having 1 to 48 carbon atoms or a fluorine-containing alkyl group having 2 to 98 carbon atoms and ether bond; when $Rf^{30}$ is the fluorine-containing alkylene group and $Rf^{31}$ is the fluorine-containing alkyl group, a sum of carbon atoms of $Rf^{30}$ and $Rf^{31}$ is not more than 49 and when either of $Rf^{30}$ or $Rf^{31}$ is the fluorine-containing alkylene group having ether bond or the fluorine-containing alkyl group having ether bond, a sum of carbon atoms of $Rf^{30}$ and $Rf^{31}$ is not more than 99.

Further the fluorine-containing polymer (I) having functional group may have a cure site in the polymer.

It is preferable that the fluorine-containing resin composition is a composition comprising the fluorine-containing polymer (I) having functional group and the rare earth metal ion (II) and is used for optical materials, namely optical amplification material and light emission material, and the fluorine-containing polymer (I) having functional group is a non-crystalline fluorine-containing polymer having the fluorine content of not less than 25% by weight, preferably not less than 40% by weight. Also it is preferable that the fluorine-containing polymer (I) having functional group has at least one ketone structure in its side chain and has a maximum absorption coefficient of not more than 1 cm$^{-1}$ in wavelength ranges of from 1,290 to 1,320 nm and/or from 1,530 to 1,570 nm and/or from 600 to 900 nm. It is further preferable that in the fluorine-containing resin composition, the rare earth metal ion (II) is at least one selected from the group consisting of erbium (Er) ion, thulium (Tm) ion, praseodymium (Pr) ion, holmium (Ho) ion, neodymium (Nd) ion, europium (Eu) ion, dysprosium (Dy) ion, samarium (Sm) ion and cerium (Ce) ion.

Also the fluorine-containing resin composition may be formed into a curable fluorine-containing resin composition by further adding an active energy curing initiator (III).

The present invention also relates to optical devices, namely optical amplification device and light emitting device made of the fluorine-containing resin composition to be used for the optical materials, namely the optical amplification materials and the light emission materials.

DETAILED DESCRIPTION

Figure 1:
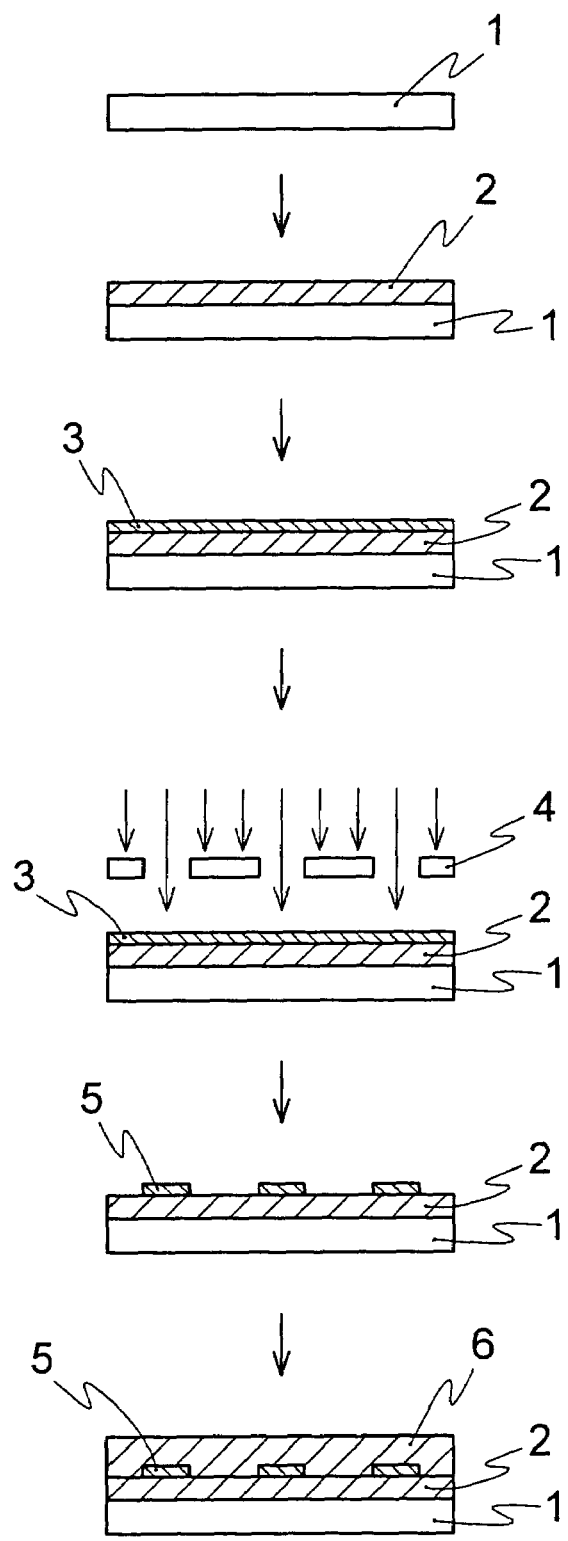
FIG. 1 is a flow chart showing production steps for producing the optical amplification device and light emitting device of the present invention.

The fluorine-containing polymer (I) having functional group which is used for the fluorine-containing resin composition of the present invention is, as mentioned above, the fluorine-containing polymer represented by the formula (1):

  (1)

in which the structural unit M is a structural unit derived from a fluorine-containing ethylenic monomer and represented by the formula (2):

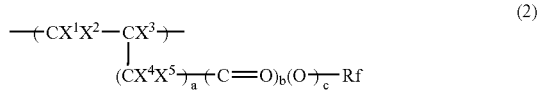

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is a fluorine-containing alkylene group having 1 to 5 >C=O units and 1 to 50 carbon atoms excluding carbon atoms of >C=O units or a fluorine-containing alkylene group having ether bond which has 1 to 5>C=O units and 2 to 100 carbon atoms excluding carbon atoms of >C=O units; a is 0 or an integer of from 1 to 3; b and c are the same or different and each is 0 or 1, the structural unit A is a structural unit derived from monomer copolymerizable with the structural unit M, and the structural unit M and the structural unit A are contained in amounts of from 0.1 to 100% by mole and from 0 to 99.9% by mole, respectively.

Namely, the fluorine-containing polymer is a homopolymer of the structural unit M derived from a fluorine-containing ethylenic monomer having, in its side chain, at least one ketone structure capable of forming a complex or a salt with a rare earth metal ion or a copolymer comprising the structural unit M derived from a fluorine-containing ethylenic monomer as an essential component.

In the present invention, the structural unit M of the fluorine-containing polymer (I) having functional group of the formula (1) is preferably a structural unit M1 derived from a fluorine-containing ethylenic monomer and represented by the formula (3):

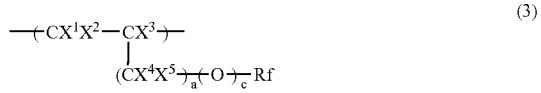

wherein $X^1$, $X^2$, $X^3$, $X^4$, $X^5$, Rf, a and c are as defined above.

The polymer having the structural unit M1 is preferred since transparency particularly in a near infrared region (hereinafter referred to as "near infrared transparency") is high and in case of not only a homopolymer of the structural unit M1 but also a copolymer containing an increased amount of the structural unit M1, near infrared transparency can be made high.

Further example of the more preferred structural unit M1 is a structural unit M2 derived from a fluorine-containing ethylenic monomer and represented by the formula (4):

wherein Rf is as defined above.

The structural unit M2 is a structural unit derived from a fluorine-containing allyl ether having at least one ketone structure and is preferred since not only near infrared transparency can be made high but also its polymerizability is good, particularly homopolymerizability and copolymerizability with other fluorine-containing ethylenic monomer are good.

Also another example of the preferred structural unit M1 is a structural unit M3 derived from a fluorine-containing ethylenic monomer and represented by the formula (5):

wherein Rf is as defined above.

The structural unit M3 is a structural unit derived from a fluorine-containing vinyl ether having at least one ketone structure and is preferred since near infrared transparency can be made high and also copolymerizability with other fluorine-containing ethylenic monomer is good.

In the fluorine-containing polymer (I) having functional group of the formula (1) which is used in the present invention, Rf contained in the structural unit M, M1, M2 and M3 is, as mentioned above, a fluorine-containing alkylene group having 1 to 5 >C=O units and 1 to 50 carbon atoms excluding carbon atoms of >C=O units or a fluorine-containing alkylene group having ether bond which has 1 to 5 >C=O units and 2 to 100 carbon atoms excluding carbon atoms of >C=O units.

The >C=O unit in Rf has an ability of forming a complex or a salt with the rare earth metal ion (II) and there can be obtained a stable structure with the rare earth metal ion (II). Therefore, in the composition of the present invention, it is conjectured that a stable structure of the rare earth metal ion (II) and the fluorine-containing polymer (I) having functional group is easily formed, for example, by an ion exchange reaction in the solution between the rare earth metal salt and the molecules of the fluorine-containing polymer (I) having functional group.

The first of the preferred Rf is:

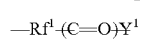

wherein $Y^1$ is H, OH, $R^1$ or $OR^2$ in which $R^1$ and $R^2$ are the same or different and each is a hydrocarbon group having 1 to 10 carbon atoms; $Rf^1$ is a fluorine-containing alkylene group having 1 to 50 carbon atoms or a fluorine-containing alkylene group having 2 to 100 carbon atoms and ether bond.

Examples of the first preferred Rf are:

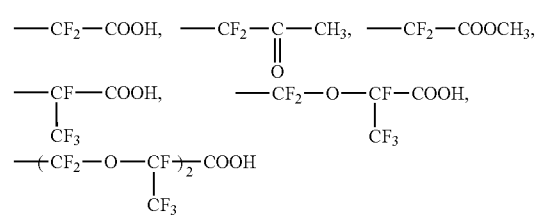

and the like.

The second of the preferred Rf is:

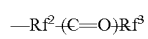

wherein $Rf^2$ is a fluorine-containing alkylene group having 1 to 49 carbon atoms or a fluorine-containing alkylene group having 2 to 99 carbon atoms and ether bond; $Rf^3$ is a fluorine-containing alkyl group having 1 to 49 carbon atoms or a fluorine-containing alkyl group having 2 to 99 carbon atoms and ether bond; when $Rf^2$ is the fluorine-containing alkylene group and $Rf^3$ is the fluorine-containing alkyl group, a sum of carbon atoms of $Rf^2$ and $Rf^3$ is not more than 50 and when either of $Rf^2$ or $Rf^3$ is the fluorine-containing alkylene group having ether bond or the fluorine-containing alkyl group having ether bond, a sum of carbon atoms of $Rf^2$ and $Rf^3$ is not more than 100.

Examples of the secondly preferred Rf are:

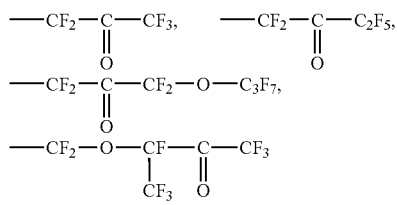

and the like.

The third of the preferred Rf is:

in which $X^6$ is H or D (heavy hydrogen); $X^7$ is H, D, halogen atom, a hydrocarbon group having 1 to 20 carbon atoms or a hydrocarbon group having 1 to 20 carbon atoms in which a part or all of hydrogen atoms are replaced with heavy hydrogens or halogen atoms; $Y^1$ is H, D, OH, OD, $R^1$ or $OR^2$, wherein $R^1$ and $R^2$ are the same or different and each is a hydrocarbon group having 1 to 10 carbon atoms or a hydrocarbon group having 1 to 10 carbon atoms in which a part or all of hydrogen atoms are replaced with heavy hydrogens or halogen atoms; $Rf^4$ is a fluorine-containing alkylene group having 1 to 49 carbon atoms or a fluorine-containing alkylene group having 2 to 99 carbon atoms and ether bond.

Examples of the thirdly preferred Rf are:

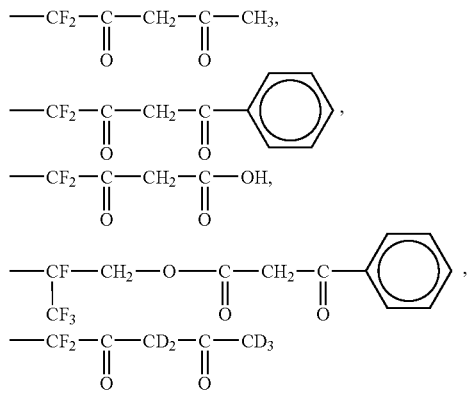

and the like.

The fourth of the preferred Rf is:

in which $X^6$ is H or D (heavy hydrogen); $X^7$ is H, D, halogen atom, a hydrocarbon group having 1 to 20 carbon atoms or a hydrocarbon group having 1 to 20 carbon atoms in which a part or all of hydrogen atoms are replaced with heavy hydrogens or halogen atoms; $Rf^5$ is a fluorine-containing alkylene group having 1 to 48 carbon atoms or a fluorine-containing alkylene group having 2 to 98 carbon atoms and ether bond; $Rf^6$ is a fluorine-containing alkyl group having 1 to 48 carbon atoms or a fluorine-containing alkyl group having 2 to 98 carbon atoms and ether bond; when $Rf^5$ is the fluorine-containing alkylene group and $Rf^6$ is the fluorine-containing alkyl group, a sum of carbon atoms of $Rf^5$ and $Rf^6$ is not more than 49 and when either of $Rf^5$ or $Rf^6$ is the fluorine-containing alkylene group having ether bond or the fluorine-containing alkyl group having ether bond, a sum of carbon atoms of $Rf^5$ and $Rf^6$ is not more than 99.

Examples of the fourthly preferred Rf are

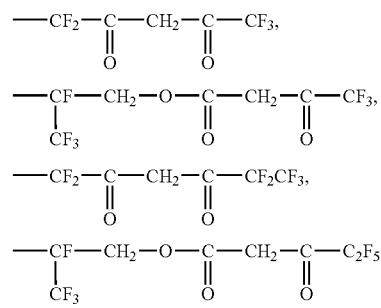

and the like.

The fifth of the preferred Rf is:

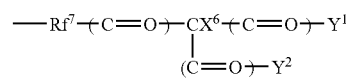

in which $X^6$ is H, D or halogen atom; $Y^1$ and $Y^2$ are the same or different and each is H, D, OH, OD, $R^1$ or $OR^2$, wherein $R^1$ and $R^2$ are the same or different and each is a hydrocarbon group having 1 to 10 carbon atoms or a hydrocarbon group having 1 to 10 carbon atoms in which a part or all of hydrogen atoms are replaced with heavy hydrogens or halogen atoms; $Rf^7$ is a fluorine-containing alkylene group having 1 to 49 carbon atoms or a fluorine-containing alkylene group having 2 to 99 carbon atoms and ether bond.

Examples of the fifthly preferred Rf are:

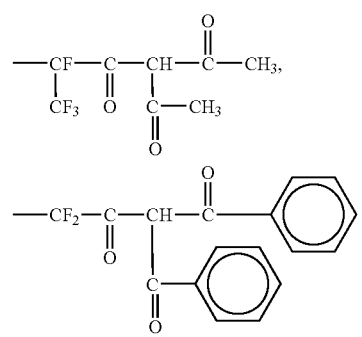

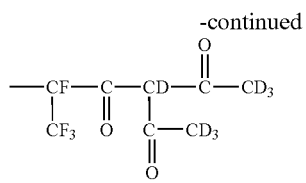

and the like.

The sixth of the preferred Rf is:

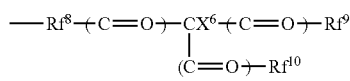

in which $X^6$ is H, D or halogen atom; $Rf^6$ is a fluorine-containing alkylene group having 1 to 48 carbon atoms or a fluorine-containing alkylene group having 2 to 98 carbon atoms and ether bond; $Rf^9$ and $Rf^{10}$ are the same or different and each is a fluorine-containing alkyl group having 1 to 48 carbon atoms or a fluorine-containing alkyl group having 2 to 98 carbon atoms and ether bond; when $Rf^8$ is the fluorine-containing alkylene group and both of $Rf^9$ and $Rf^{10}$ are the fluorine-containing alkyl groups, a sum of carbon atoms of $Rf^8$, $Rf^9$ and $Rf^{10}$ is not more than 49 and when any one or two of $Rf^8$, $Rf^9$ and $Rf^{10}$ are the fluorine-containing alkylene group having ether bond or the fluorine-containing alkyl group having ether bond, a sum of carbon atoms of $Rf^8$, $Rf^9$ and $Rf^{10}$ is not more than 99.

Examples of the sixthly preferred Rf are:

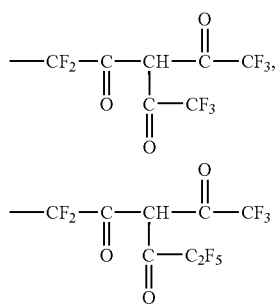

and the like.

The seventh of the preferred Rf is:

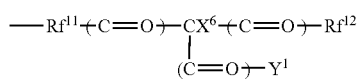

in which $X^6$ is H, D or halogen atom; $Y^1$ is H, D, OH, OD, $R^1$ or $OR^2$, wherein $R^1$ and $R^2$ are the same or different and each is a hydrocarbon group having 1 to 10 carbon atoms or a hydrocarbon group having 1 to 10 carbon atoms in which a part or all of hydrogen atoms are replaced with heavy hydrogens or halogen atoms; $Rf^{11}$ is a fluorine-containing alkylene group having 1 to 48 carbon atoms or a fluorine-containing alkylene group having 2 to 98 carbon atoms and ether bond; $Rf^{12}$ is a fluorine-containing alkyl group having 1 to 48 carbon atoms or a fluorine-containing alkyl group having 2 to 98 carbon atoms and ether bond; when $Rf^{11}$ is the fluorine-containing alkylene group and $Rf^{12}$ is the fluorine-containing alkyl group, a sum of carbon atoms of $Rf^{11}$ and $Rf^{12}$ is not more than 49 and when either of $Rf^{11}$ or $Rf^{12}$ is the fluorine-containing alkylene group having ether bond or the fluorine-containing alkyl group having ether bond, a sum of carbon atoms of $Rf^{11}$ and $Rf^{12}$ is not more than 99.

Examples of the seventhly preferred Rf are:

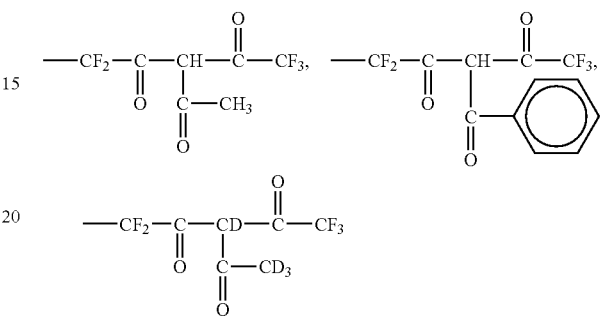

and the like.

In the fluorine-containing polymer (I) having functional group of the formula (1) of the present invention, —$Rf^2$—, —$Rf^4$—, —$Rf^5$—, —$Rf^7$—, —$Rf^8$— and —$Rf^{11}$—(hereinafter collectively referred to as "Rf″ group") contained in Rf of the structural units M, M1, M2 and M3 are fluorine-containing alkylene groups having 1 to 49 carbon atoms or fluorine-containing alkylene groups having 2 to 99 carbon atoms and ether bond. In the Rf″ group, fluorine atom is bonded to carbon atom. Generally the Rf″ group is a fluorine-containing alkylene group or a fluorine-containing alkylene group having ether bond, in which fluorine atom and hydrogen atom or chlorine atom are bonded to carbon atom. It is preferable that more fluorine atoms are contained (a high fluorine content). The fluorine content is not less than 50%, preferably not less than 70% based on the molecular weight of the Rf″ group excluding oxygen atoms, and the Rf″ group is more preferably a perfluoroalkylene group or a perfluoroalkylene group having ether bond. Thereby near infrared transparency of the fluorine-containing polymer (I) having functional group can be increased and particularly when the content of the functional groups is increased to increase the content of the rare earth metal ion (II), a high near infrared transparency of the polymer can be maintained, which is preferred.

When the number of carbon atoms of the Rf″ group is too large, it is not preferable because in case of the fluorine-containing alkylene group, there is a case where solubility in a solvent of the fluorine-containing polymer (I) having functional group is lowered and in case of the fluorine-containing alkylene group having ether bond, there is a case where a glass transition temperature and physical properties of the fluorine-containing polymer (I) having functional group and the cured article obtained therefrom are lowered. The number of carbon atoms of the fluorine-containing alkylene group is preferably from 1 to 20, more preferably from 1 to 10, and the number of carbon atoms of the fluorine-containing alkylene group having ether bond is preferably from 2 to 30, more preferably from 2 to 20.

Examples of preferred Rf″ are:

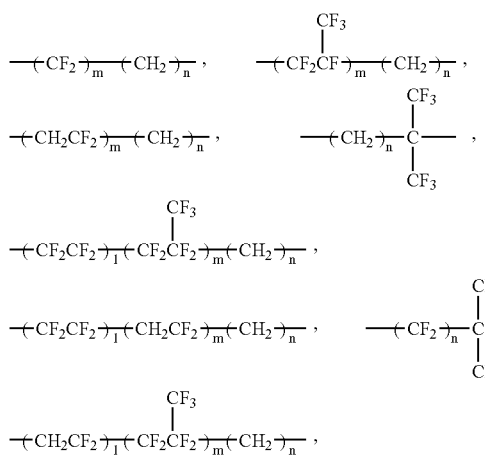

(l: from 1 to 10 μm: from 1 to 10, n: from 0 to 5)

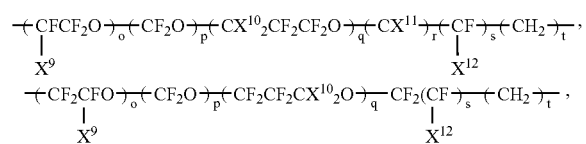

($X^9$ and $X^{12}$ are F or $CF_3$; $X^{10}$ and $X^{11}$ are H or F; o+p+q is from 1 to 30; r is 0 or 1; s and t are 0 or 1) and the like.

As mentioned above, the structural unit M constituting the fluorine-containing polymer (I) having functional group of the present invention is preferably the structural unit M1 and further the structural unit M1 is preferably the structural units M2 and M3. Next, mentioned below are examples of the structural units M2 and M3.

Examples of the preferred monomers providing the structural unit M2 are as follows when the unit containing the ketone group (for example, from the first to the seventh Rf mentioned above) is represented by Rf′:

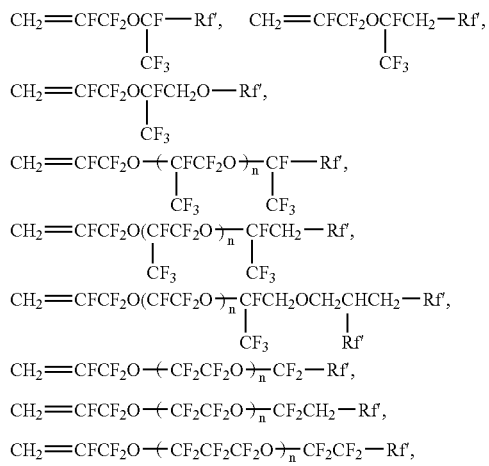

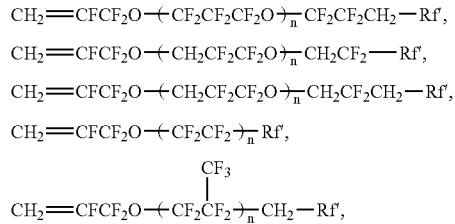

(n: an integer of from 1 to 30) and the like.

More concretely there are:

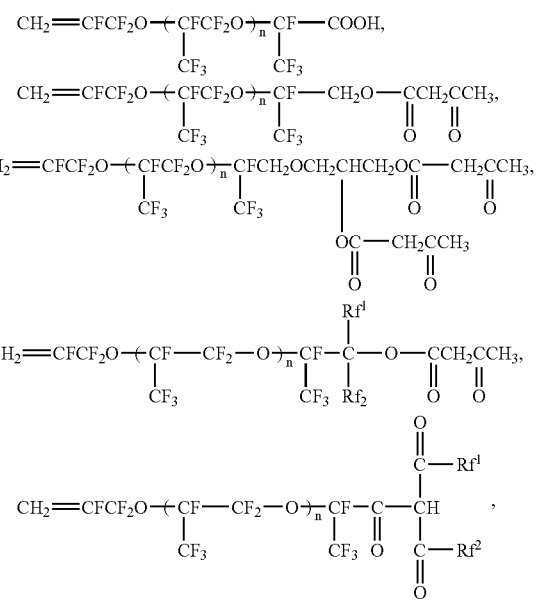

(n is an integer of from 0 to 30; $Rf^1$ and $Rf^2$ are perfluoroalkyl groups having 1 to 5 carbon atoms) and the like.

Examples of the preferred monomer providing the structural unit M3 are as follows when the unit containing the ketone group is represented by Rf′:

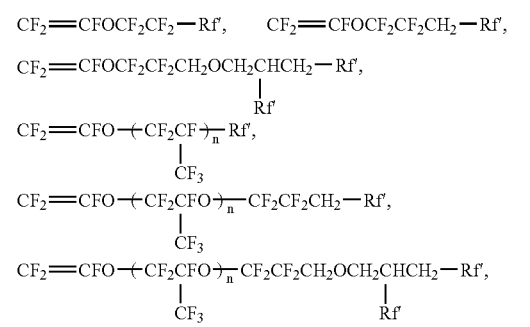

(n is an integer of from 1 to 30)

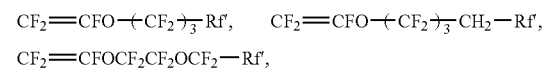

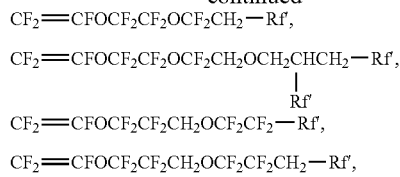

and the like.

More concretely there are:

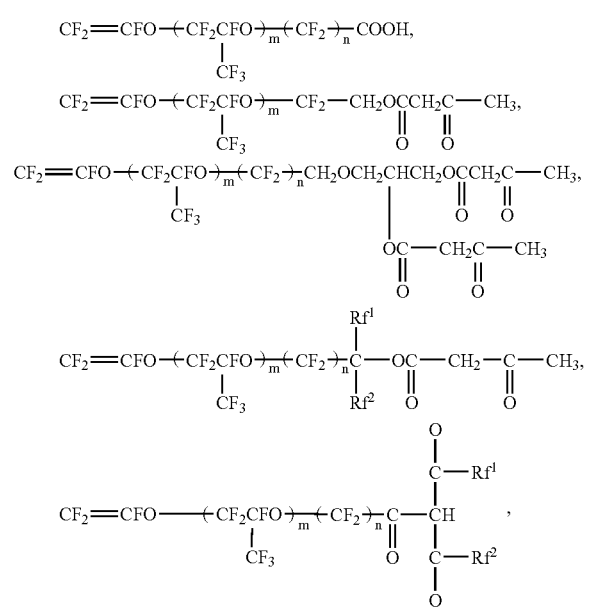

(m is an integer of from 0 to 30; n is an integer of from 1 to 3; $Rf^1$ and $Rf^2$ are perfluoroalkyl groups having 1 to 5 carbon atoms)

and the like.

Examples of the monomer constituting the structural unit M of the fluorine-containing polymer (I) having functional group other than the above-mentioned structural units M2 and M3 are, for instance, as follows when the unit containing the ketone group (for example, the above-mentioned first to seventh Rf) is represented by Rf':

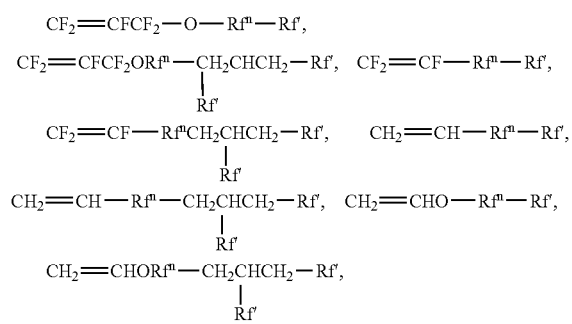

and the like wherein Rf" is as defined above.

More concretely there are:

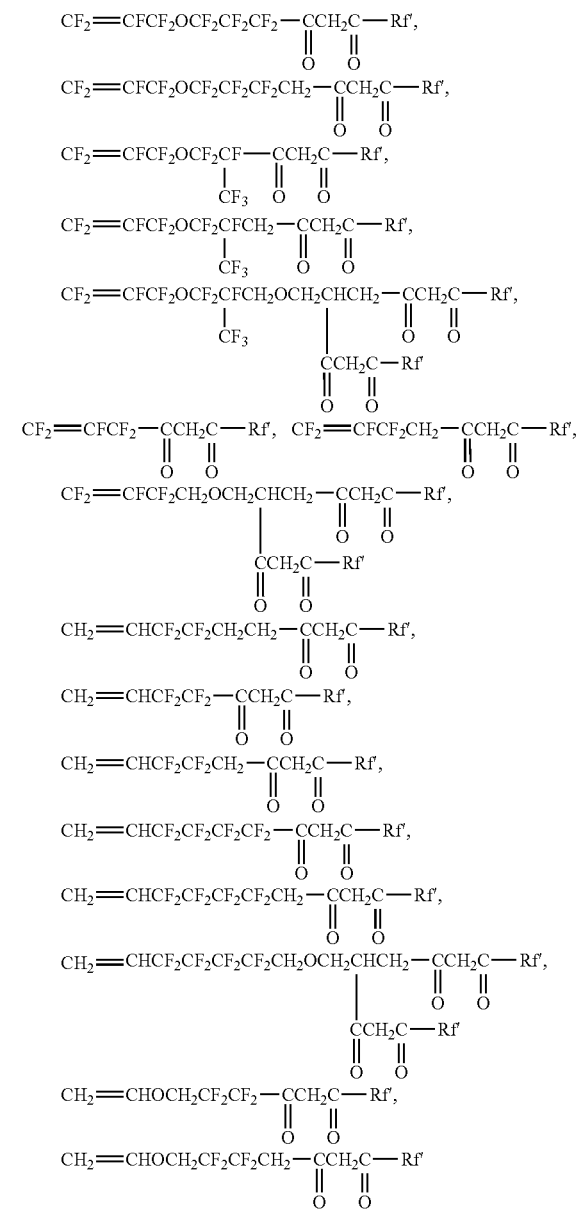

and the like, wherein Rf' is as defined above.

In the fluorine-containing polymer (I) having functional group of the present invention, the structural unit A is an optional component. The structural unit A is not limited particularly as far as it is a monomer copolymerizable with the structural units M, M1, M2 and M3. The structural unit A may be optionally selected depending on intended characteristics required of the fluorine-containing polymer (I) having functional group.

Examples of the structural unit A are, for instance, as follows.

(i) Structural Units Derived from Fluorine-Containing Ethylenic Monomers having functional group but not having >C=O unit These structural units are preferred from the point that adhesion to a substrate and solubility in a solvent, particularly a general-purpose solvent can be imparted to the fluorine-containing polymer (I) having functional group and the composition obtained therefrom while maintaining a high near infrared transparency, and are also preferred from the point that other functions such as crosslinkability can be imparted. Preferred structural unit of the fluorine-containing ethylenic monomer having functional group is a structural unit represented by the formula (6):

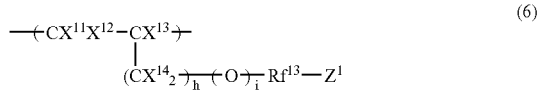

wherein $X^{11}$, $X^{12}$ and $X^{13}$ are the same or different and each is H or F; $X^{14}$ is H, F or $CF_3$; h is 0, 1 or 2; i is 0 or 1; $Rf^{13}$ is a fluorine-containing alkylene group having 1 to 40 carbon atoms or a fluorine-containing alkylene group having 2 to 100 carbon atoms and ether bond; $Z^1$ is at least one selected from —OH, —$CH_2$OH, —$SO_3$H, sulfonic acid derivative, epoxy and cyano, and particularly preferred is a structural unit derived from:

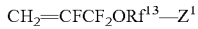

wherein $Rf^{13}$ and $Z^1$ are as defined above.

More concretely there are preferably structural units derived from fluorine-containing ethylenic monomers such as:

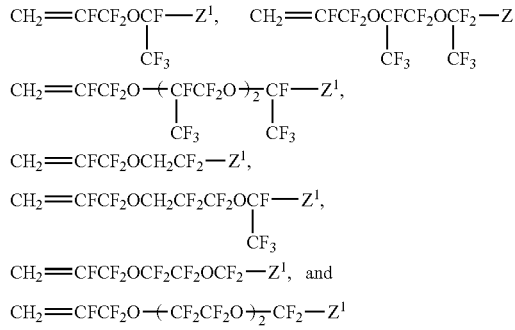

wherein $Z^1$ is as defined above.

Also there is a preferred structural unit derived from:

wherein $Rf^{13}$ and $Z^1$ are as defined above. More concretely there are structural units derived from monomers such as:

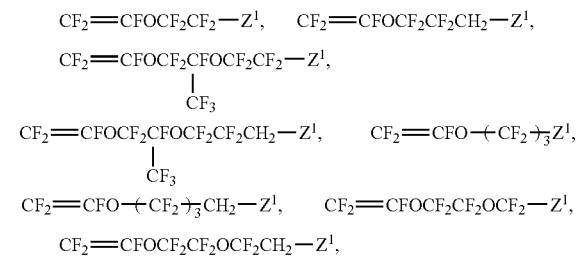

-continued

wherein $Z^1$ is as defined above.

Examples of the other fluorine-containing ethylenic monomer having functional group are:

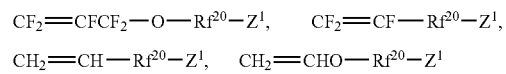

and the like, wherein $Z^1$ is as defined above; $Rf^{20}$ is a fluorine-containing alkylene group having 1 to 40 carbon atoms or a fluorine-containing alkylene group having 2 to 100 carbon atoms and ether bond. More concretely there are:

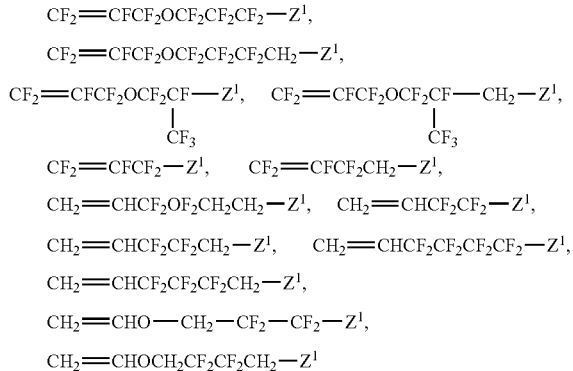

and the like, wherein $Z^1$ is as defined above.

(ii) Structural Units Derived from Fluorine-Containing Ethylenic Monomers Having No Functional Group These structural units are preferred from the point that a low refractive index of the fluorine-containing polymer having functional group and a cured article obtained therefrom can be maintained and also from the point that further lower refractive index can be obtained. Further these structural units are preferred from the point that by selecting the monomer, mechanical properties and glass transition temperature of the polymer can be adjusted, particularly the glass transition temperature can be increased by copolymerization with the structural unit M.

Examples of the preferred structural units (ii) of the fluorine-containing ethylenic monomer are those represented by the formula (7):

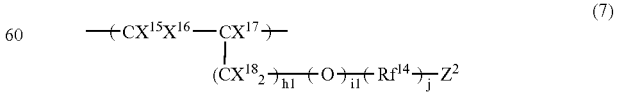

wherein $X^{15}$, $X^{15}$ and $X^{18}$ are the same or different and each is H or F; $X^{17}$ is H, F or $CF_3$; h1, i1 and j are the same or different and each is 0 or 1; $Z^2$ is H, F or Cl; $Rf^{14}$ is a fluorine-containing alkylene group having 1 to 20 carbon atoms or a fluorine-containing alkylene group having 2 to 100 carbon atoms and ether bond.

Examples thereof are preferably structural units derived from monomers such as:

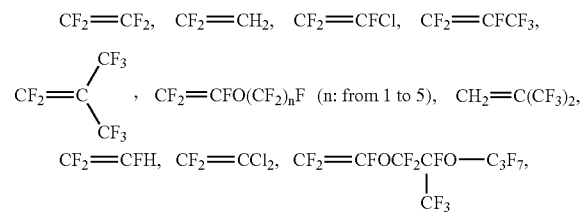

$CH_2=CF(CF_2)_nZ^2$ ($Z^2$ is as defined in the formula (7), n: from 1 to 10) and $CH_2=CHOCH_2(CF_2)_nZ^2$ ($Z^2$ is as defined in the formula (7), n: from 1 to 10)

(iii) Fluorine-Containing Aliphatic Ring Structural Units

Introduction of these structural units (iii) is preferred since transparency can be increased, a further lower refractive index can be obtained and further the fluorine-containing polymer having functional group which has a high glass transition temperature can be obtained.

Examples of the preferred fluorine-containing aliphatic ring structural unit (iii) are those represented by the formula (8):

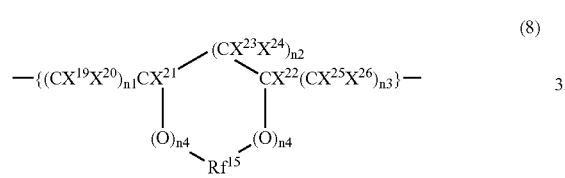

(8)

wherein $X^{19}$, $X^{20}$, $X^{23}$, $X^{24}$, $X^{25}$ and $X^{25}$ are the same or different and each is H or F; $X^{21}$ and $X^{22}$ are the same or different and each is H, F, Cl or $CF_3$; $Rf^{15}$ is a fluorine-containing alkylene group having 1 to 10 carbon atoms or a fluorine-containing alkylene group having 2 to 10 carbon atoms and ether bond; n2 is 0 or an integer of from 1 to 3; n1, n3, n4 and n5 are the same or different and each is 0 or 1.

For example, there are structural units represented by:

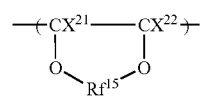

wherein $Rf^{15}$, $X^{21}$ and $X^{22}$ are as defined above.

Concretely there are:

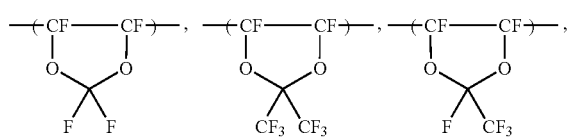

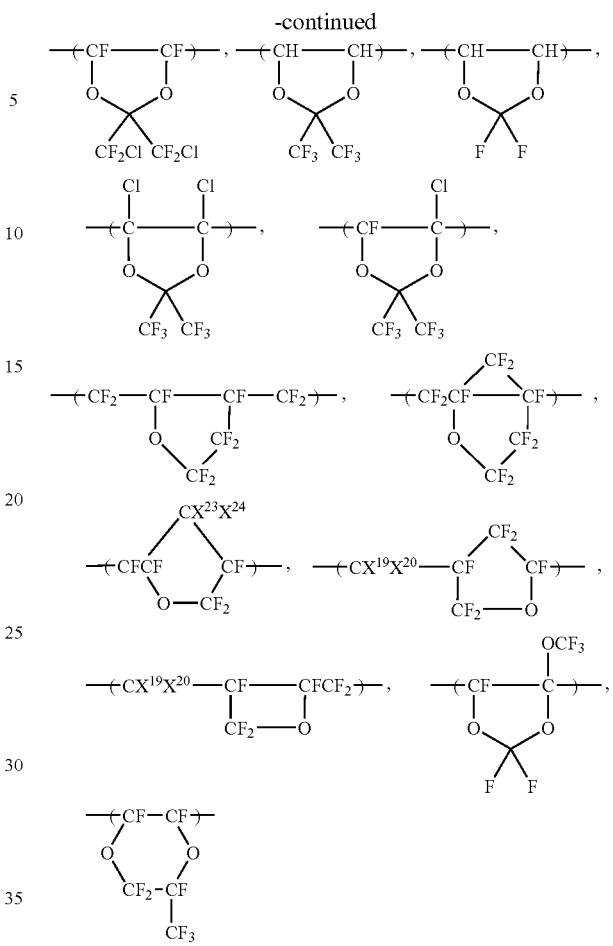

and the like wherein $X^{19}$, $X^{20}$, $X^{23}$ and $X^{24}$ are as defined above.

Examples of the other fluorine-containing aliphatic ring structural unit are, for instance,

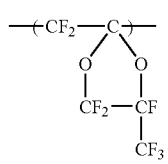

and the like.

(iv) Structural Units Derived from Ethylenic Monomers Having No Fluorine

The structural units (iv) derived from ethylenic monomers having no fluorine may be introduced to the polymer in a range where the introduction does not have an adverse effect on a refractive index (a refractive index is not increased).

The introduction of these structural units (iv) is preferred since solubility in a general-purpose solvent is enhanced and compatibility with additives, for example, a photocatalyst and a curing agent to be added as case demands can be improved.

Examples of the non-fluorine-containing ethylenic monomer are as follows.

α-Olefins:

Ethylene, propylene, butene, vinyl chloride, vinylidene chloride and the like.

Vinyl Ether or Vinyl Ester Monomers:

CH$_2$=CHOR, CH$_2$=CHOCOR(R: hydrocarbon group having 1 to 20 carbon atoms) and the like.

Allyl monomers:

CH$_2$=CHCH$_2$Cl, CH$_2$=CHCH$_2$OH,
CH$_2$=CHCH$_2$COOH, CH$_2$=CHCH$_2$Br and the like.

Allyl ether monomers:

CH$_2$=CHCH$_2$OR (R: hydrocarbon group having 1 to 20 carbon atoms),

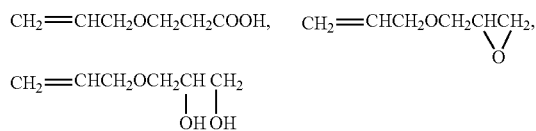

and the like.

Acrylic or Methacrylic Monomers:

Acrylic acid, methacrylic acid, acrylic acid esters, methacrylic acid esters, maleic anhydride, maleic acid, maleic acid esters and the like.

Monomers obtained by replacing a part or the whole of hydrogen atoms of the above-mentioned non-fluorine-containing monomers with heavy hydrogen atoms are preferred from the viewpoint of near infrared transparency.

(V) Structural Units Derived from Alicyclic Monomers

A structural unit (v) of an alicyclic monomer may be introduced as a component copolymerizable with the structural unit M, more preferably as the third component in addition to the structural unit M and the structural unit of the above-mentioned fluorine-containing ethylenic monomer or non-fluorine-containing ethylenic monomer (the above-mentioned (iii) or (iv)), thereby making a glass transition temperature and hardness high.

Examples of the alicyclic monomer (v) are norbornene derivatives represented by:

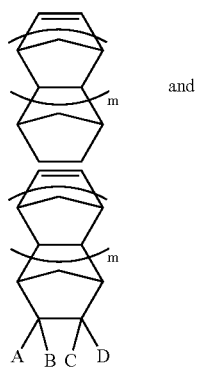

wherein m is 0 or an integer of from 1 to 3; A, B, C and D are the same or different and each is H, F, Cl, COOH, CH$_2$OH, a perfluoroalkyl group having 1 to 5 carbon atoms or the like, alicyclic monomers such as:

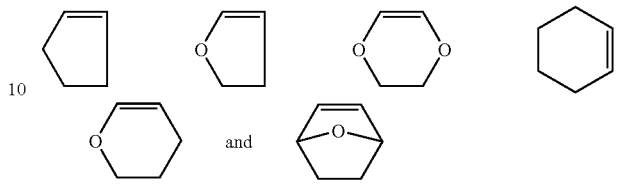

and derivatives thereof in which a substituent is introduced.

Among the fluorine-containing polymers (I) having functional group which are used for the composition of the present invention, the fluorine-containing polymer represented by the formula (20):

$$-(M)-(A)- \quad (20)$$

in which the structural unit M is a structural unit derived from a fluorine-containing ethylenic monomer and represented by the formula (21):

$$-(CX^1X^2-CX^3)- \atop (CX^4X^5)_a-(C=O)_b(O)_c-Rf^x \quad (21)$$

wherein $X^1$ and $X^2$ are the same or different and each is H or F; $X^3$ is H, F, CH$_3$ or CF$_3$; $X^4$ and $X^5$ are the same or different and each is H, F or CF$_3$; Rf$^x$ is a group represented by the formula (22), (23), (24), (25) or (26) mentioned infra; a is 0 or an integer of from 1 to 3; b and c are the same or different and each is 0 or 1, the structural unit A is a structural unit derived from monomer copolymerizable with the structural unit M, and the structural unit M and the structural unit A are contained in amounts of from 0.1 to 100% by mole and from 0 to 99.9% by mole, respectively, is a novel polymer not disclosed in any literatures.

Examples of Rf$^x$ are as follows.

Formula (22):

$$-Rf^4-((C=O)CX^6X^7-(C=O))Y^1 \quad (22)$$

in which $X^6$ is H or D; $X^7$ is H, D, halogen atom, a hydrocarbon group having 1 to 20 carbon atoms or a hydrocarbon group having 1 to 20 carbon atoms in which a part or all of hydrogen atoms are replaced with heavy hydrogens or halogen atoms; $Y^1$ is H, D, OH, OD, R$^1$ or OR$^2$, wherein R$^1$ and R$^2$ are the same or different and each is a hydrocarbon group having 1 to 10 carbon atoms or a hydrocarbon group having 1 to 10 carbon atoms in which a part or all of hydrogen atoms are replaced with heavy hydrogens or halogen atoms; Rf$^4$ is a fluorine-containing alkylene group having 1 to 49 carbon atoms or a fluorine-containing alkylene group having 2 to 99 carbon atoms and ether bond.

Formula (23):

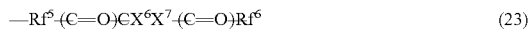

in which $X^6$ is H or D; $X^7$ is H, D, halogen atom, a hydrocarbon group having 1 to 20 carbon atoms or a hydrocarbon group having 1 to 20 carbon atoms in which a part or all of hydrogen atoms are replaced with heavy hydrogens or halogen atoms; $Rf^5$ is a fluorine-containing alkylene group having 1 to 48 carbon atoms or a fluorine-containing alkylene group having 2 to 98 carbon atoms and ether bond; $Rf^6$ is a fluorine-containing alkyl group having 1 to 48 carbon atoms or a fluorine-containing alkyl group having 2 to 98 carbon atoms and ether bond; when $Rf^5$ is the fluorine-containing alkylene group and $Rf^6$ is the fluorine-containing alkyl group, a sum of carbon atoms of $Rf^5$ and $Rf^6$ is not more than 49 and when either of $Rf^5$ or $Rf^6$ is the fluorine-containing alkylene group having ether bond or the fluorine-containing alkyl group having ether bond, a sum of carbon atoms of $Rf^5$ and $Rf^6$ is not more than 99.

Formula (24):

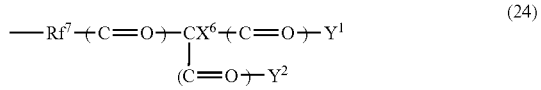

in which $X^6$ is H, D or halogen atom; $Y^1$ and $Y^2$ are the same or different and each is H, D, OH, OD, $R^1$ or $OR^2$, wherein $R^1$ and $R^2$ are the same or different and each is a hydrocarbon group having 1 to 10 carbon atoms or a hydrocarbon group having 1 to 10 carbon atoms in which a part or all of hydrogen atoms are replaced with heavy hydrogens or halogen atoms; $Rf^7$ is a fluorine-containing alkylene group having 1 to 49 carbon atoms or a fluorine-containing alkylene group having 2 to 99 carbon atoms and ether bond.

Formula (25):

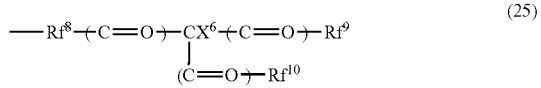

in which $X^6$ is H, D or halogen atom; $Rf^8$ is a fluorine-containing alkylene group having 1 to 48 carbon atoms or a fluorine-containing alkylene group having 2 to 98 carbon atoms and ether bond; $Rf^9$ and $Rf^{10}$ are the same or different and each is a fluorine-containing alkyl group having 1 to 48 carbon atoms or a fluorine-containing alkyl group having 2 to 98 carbon atoms and ether bond; when $Rf^8$ is the fluorine-containing alkylene group and both of $Rf^9$ and $Rf^{10}$ are the fluorine-containing alkyl groups, a sum of carbon atoms of $Rf^8$, $Rf^9$ and $Rf^{10}$ is not more than 49 and when any one or two of $Rf^8$, $Rf^9$ and $Rf^{10}$ are the fluorine-containing alkylene group having ether bond or the fluorine-containing alkyl group having ether bond, a sum of carbon atoms of $Rf^8$, $Rf^9$ and $Rf^{10}$ is not more than 99.

Formula (26):

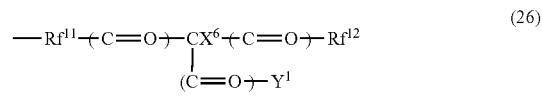

in which $X^6$ is H, D or halogen atom; $Y^1$ is H, D, OH, OD, $R^1$ or $OR^2$, wherein $R^1$ and $R^2$ are the same or different and each is a hydrocarbon group having 1 to 10 carbon atoms or a hydrocarbon group having 1 to 10 carbon atoms in which a part or all of hydrogen atoms are replaced with heavy hydrogens or halogen atoms; $Rf^{11}$ is a fluorine-containing alkylene group having 1 to 48 carbon atoms or a fluorine-containing alkylene group having 2 to 98 carbon atoms and ether bond; $Rf^{12}$ is a fluorine-containing alkyl group having 1 to 48 carbon atoms or a fluorine-containing alkyl group having 2 to 98 carbon atoms and ether bond; when $Rf^{11}$ is the fluorine-containing alkylene group and $Rf^{12}$ is the fluorine-containing alkyl group, a sum of carbon atoms of $Rf^{11}$ and $Rf^{12}$ is not more than 49 and when either of $Rf^{11}$ or $Rf^{12}$ is the fluorine-containing alkylene group having ether bond or the fluorine-containing alkyl group having ether bond, a sum of carbon atoms of $Rf^{11}$ and $Rf^{12}$ is not more than 99.

As the structural unit M in the formula (20), preferred are structural units M1, M2 and M3 represented by the following formulae (27), (28) and (29), respectively.

Structural unit M1 derived from a fluorine-containing ethylenic monomer and represented by the formula (27):

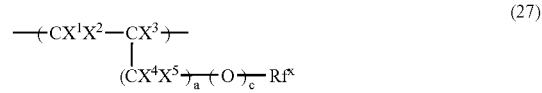

wherein $X^1$, $X^2$, $X^3$, $X^4$, $X^5$, $Rf^x$, a and c are as defined in the above-mentioned formula (21).

Structural unit M2 derived from a fluorine-containing ethylenic monomer and represented by the formula (28):

wherein $Rf^x$ is as defined above.

Structural unit M3 derived from a fluorine-containing ethylenic monomer and represented by the formula (29):

wherein $Rf^x$ is as defined above.

Nonlimiting examples of the monomer providing the structural unit M in the formula (20) are those mentioned below though they overlap with the above-mentioned examples in the fluorine-containing polymer (I) having functional group.

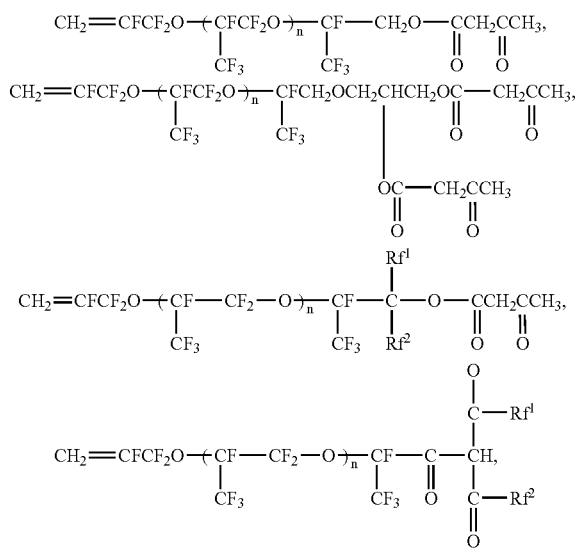

(n: 0 or an integer of from 1 to 30; $Rf^1$ and $Rf^2$ are perfluoroalkyl groups having 1 to 5 carbon atoms)

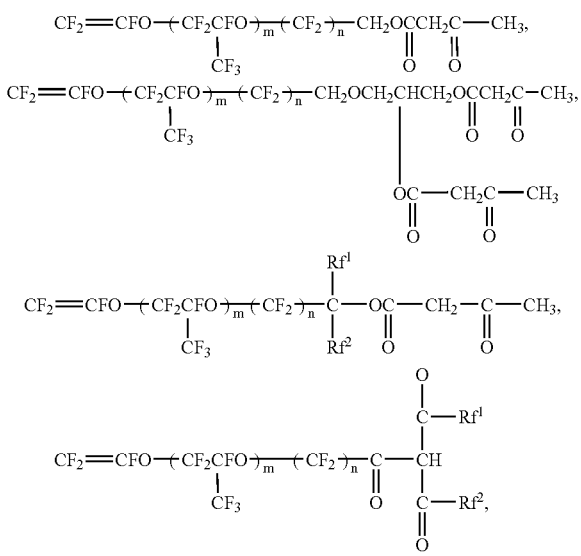

(m: 0 or an integer of from 1 to 30; n: an integer of from 1 to 3; $Rf^1$ and $Rf^2$ are perfluoroalkyl groups having 1 to 5 carbon atoms)

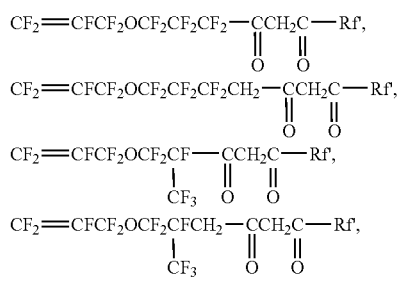

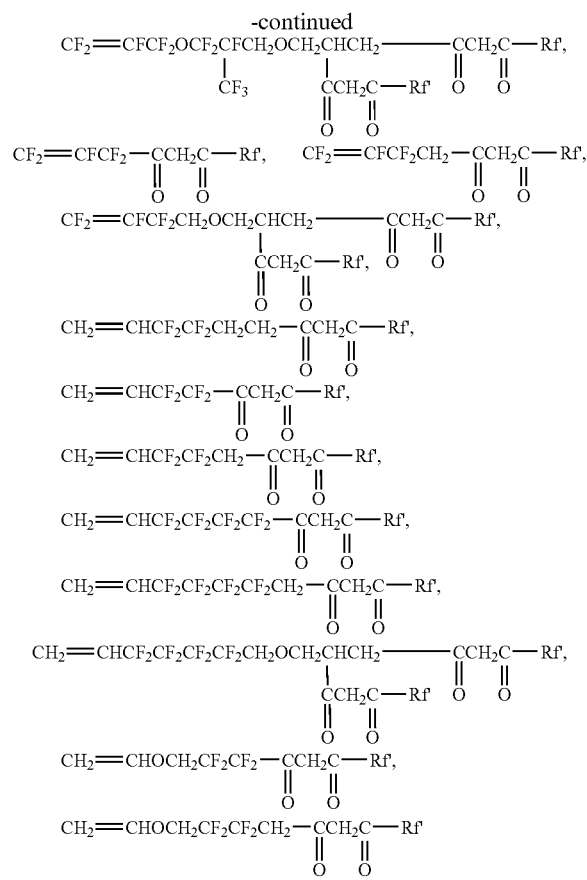

wherein Rf is as defined above.

Also a fluorine-containing ethylenic monomer providing the structural unit M in the formula (20) and represented by the formula (30):

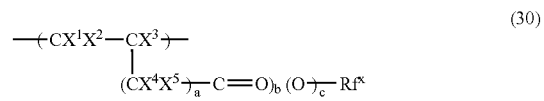

(30)

wherein $X^1$ and $X^2$ are the same or different and each is H or F; $X^3$ is H, F, $CH_3$ or $CF_3$; $X^4$ and $X^5$ are the same or different and each is H, F or $CF_3$; $Rf^x$ is a group represented by the above-mentioned formula (22), (23), (24), (25) or (26); a is 0 or an integer of from 1 to 3; b and c are the same or different and each is 0 or 1, is a novel compound not disclosed in any literature. Examples of this novel monomer are as exemplified above.

The present invention further relates to the fluorine-containing resin composition comprising (I) the fluorine-containing polymer having functional group and (II) the rare earth metal ion, wherein the fluorine-containing polymer (I) having functional group has a structural moiety represented by the formula (10):

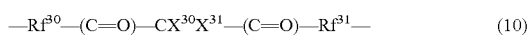

(10)

wherein $X^{30}$ is H or D (heavy hydrogen); $X^{31}$ is H, D, halogen atom, a hydrocarbon group having 1 to 20 carbon atoms or a hydrocarbon group having 1 to 20 carbon atoms in which a part or all of hydrogen atoms are replaced with heavy hydrogens or halogen atoms; $Rf^{30}$ is a fluorine-containing alkylene group having 1 to 48 carbon atoms or a fluorine-containing alkylene group having 2 to 98 carbon atoms and ether bond; $Rf^{31}$ is a fluorine-containing alkyl group having 1 to 48 carbon atoms or a fluorine-containing alkyl group having 2 to 98 carbon atoms and ether bond; when $Rf^{30}$ is the fluorine-containing alkylene group and $Rf^{31}$ is the fluorine-containing alkyl group, a sum of carbon atoms of $Rf^{30}$ and $Rf^{31}$ is not more than 49 and when either of $Rf^{30}$ or $Rf^{31}$ is the fluorine-containing alkylene group having ether bond or the fluorine-containing alkyl group having ether bond, a sum of carbon atoms of $Rf^{30}$ and $Rf^{31}$ is not more than 99.

Examples of the structural moiety represented by the formula (10) are:

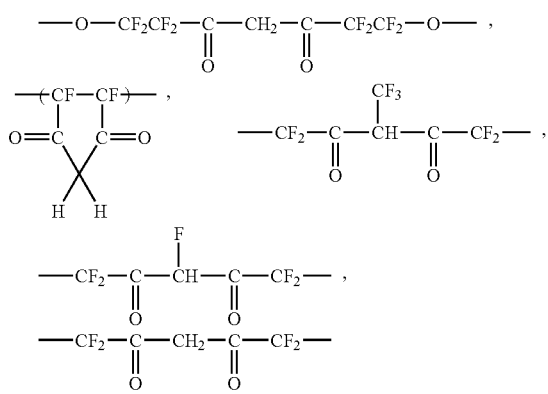

and the like. In the following explanation, the structural moiety represented by the formula (10) is referred to as the structural unit M.

In the fluorine-containing polymer (I) having functional group of the present invention, various combinations and proportions of the structural units M (M1, M2 or M3) and A can be selected from those mentioned above depending on intended applications, physical properties (particularly glass transition temperature, hardness, etc.), functions (transparency and refractive index) and the like.

The fluorine-containing polymer (I) having functional group of the present invention contains the structural unit M (M1, M2 or M3) as an essential component and is characterized in that the structural unit M itself has functions of imparting a near infrared transparency and forming a stable structure by forming a complex or a salt with the rare earth metal ion (II). Therefore even if the fluorine-containing polymer (I) having functional group contains a larger amount of the structural unit M or in the extreme case, even if the polymer consists of the structural unit M (100% by mole), a high near infrared transparency can be maintained. Further the polymer is preferred from the point that a stable structure is formed by forming a complex or a salt with the rare earth metal ion (II).

Also in the case of the copolymer which is the fluorine-containing polymer (I) having functional group and comprises the structural unit M and the structural unit A, when the structural unit A is selected from the above-mentioned examples, there can be obtained the polymer having a higher hardness, a high glass transition temperature and a high near infrared transparency.

When the fluorine-containing polymer (I) having functional group is the copolymer comprising the structural unit M and the structural unit A, the proportion of the structural unit M may be not less than 0.1% by mole based on the whole structural units constituting the fluorine-containing polymer (I) having functional group. In order to obtain the stable structure with the rare earth metal ion (II), it is preferable that the proportion is not less than 2.0% by mole, preferably not less than 5% by mole, more preferably not less than 10% by mole.

Particularly for obtaining high efficiency optical amplification materials and light emission materials, it is preferable that the structural unit M is contained in an amount of not less than 10% by mole, preferably not less than 20% by mole, more preferably not less than 50% by mole. An upper limit thereof is lower than 100% by mole.

The fluorine-containing polymer (I) having functional group of the present invention has preferable characteristics particularly for the optical amplification material application in a near infrared region and for the ruminant application in a region of from visible light to near infrared ray since transparency is not lowered even if the proportion of the structural unit M is increased (or even if the coordination sites of the rare earth metal ion (II) are increased).

In case of the optical amplification material in optical communication application and the light emission material in a region of from visible light to near infrared ray, in which a high transparency is required, it is important that the fluorine-containing polymer (I) having functional group has a combination and proportion of the structural units M and A which make the polymer non-crystalline. Being non-crystalline means that in DSC analysis, when measurement is carried out at a temperature raising rate of 10° C./min (ASTM D3418-99), an absorption peak derived from melting is not substantially observed or heat of fusion is not more than 1 J/g at the 2nd run.

It is preferable that the fluorine content of the fluorine-containing polymer (I) having functional group is not less than 25% by weight.

If the fluorine content is low, transparency in a near infrared region is lowered. Also if the fluorine content is low, moisture absorption is increased and therefore the polymer cannot be used substantially as an optical material for optical communication, etc. For the optical amplification material and light emission material applications, most preferable fluorine content is not less than 40% by weight. An upper limit of the fluorine content varies depending on the components of the fluorine-containing polymer (I) and is about 75% by weight which is a fluorine content when all hydrogen atoms are replaced with fluorine atoms.

As a method of measuring a fluorine content, generally there is used a method of calculating the fluorine content by analyzing components of a polymer from measurements with $^{19}$F-NMR and $^{1}$H-NMR. When it is difficult to analyze a polymer structure by the above methods, there is used a method of elementary analysis of fluorine in which 2 mg of a sample and a combustion improver (10 mg of sodium peroxide) are wrapped with a filter paper (filter paper No. 7 available from Toyo Roshi), are put in a platinum basket and then are burned in a 500 ml flask filled with 25 ml of pure water. Immediately after the burning, the flask is shaken to absorb fluorine ion in pure water and then fluorine ion absorbed in pure water is analyzed with a fluorine ion electrode (fluorine ion meter model 901 available from Orion Research).

The fluorine-containing polymer (I) having functional group of the present invention is preferably one having a maximum absorption coefficient of not more than 1 cm$^{-1}$ at specific communication bands (1,290 to 1,320 nm, 1,530 to 1,570 nm and 600 to 900 nm). Polymers having an absorption coefficient higher than that are not suitable as an optical amplification material used for optical communication.

The rare earth metal ion (II) which is an another component in the fluorine-containing resin composition of the present invention is added to impart optical functionality, namely optical amplifying action and light emitting action to the resin composition.

Example of the rare earth metal ion (II) which is used in the present invention is at least one selected from the group consisting of erbium (Er) ion, thulium (Tm) ion, praseodymium (Pr) ion, holmium (Ho) ion, neodymium (Nd) ion, europium (Eu) ion, dysprosium (Dy) ion, samarium (Sm) ion and cerium (Ce) ion. The fluorine-containing resin composition of the present invention contains the rare earth metal ion (II) in the form of cation, and the rare earth metal ions may be mixed solely or in a mixture thereof.

The valence of the rare earth metal ion is not limited particularly and the rare earth metal ion is usually used as a divalent cation or trivalent cation. Also the rare earth metal ion is usually mixed in the form of a rare earth metal compound or complex. Concretely halides such as chlorides, bromides and iodides; and salts such as nitrates, perchlorates, bromates, acetates, sulfates and phosphates are suitable as the rare earth metal compound from the viewpoint of dispersibility in the fluorine-containing polymer (I) having functional group. Also double nitrates, double sulfates, chelated compounds and complex can be used. Examples thereof are sulfonamides, sulfonimides, β-diketones, sulfonic acids, phosphoric acids and the like. Particularly preferred are fluorine-containing compounds thereof.

Examples of the halides and salts containing the rare earth metal ion suitable in the present invention are praseodymium salts such as praseodymium chloride, praseodymium bromide, praseodymium iodide, praseodymium nitrate, praseodymium perchlorate, praseodymium bromate, praseodymium acetate, praseodymium sulfate and praseodymium phosphate; neodymium salts such as neodymium chloride, neodymium bromide, neodymium iodide, neodymium nitrate, neodymium perchlorate, neodymium bromate, neodymium acetate, neodymium sulfate and neodymium phosphate; europium salts such as europium chloride, europium bromide, europium iodide, europium nitrate, europium perchlorate, europium bromate, europium acetate, europium sulfate and europium phosphate; erbium salts such as erbium chloride, erbium bromide, erbium iodide, erbium nitrate, erbium perchlorate, erbium bromate, erbium acetate, erbium sulfate and erbium phosphate; and the like.

Further examples of a suitable complex containing rare earth metal ion are, for instance, tris(dibenzoylmethyde) erbium (III), tris(benzoyltrifluoroacetonate) erbium (III), tris(hexafluoroacetonate) erbium (III), tris(dibenzoylmethyde) neodymium (III), tris(benzoyltrifluoroacetonate) neodymium (III), tris(hexafluoroacetonate) neodymium (III) and the like. Also those complexes may be tetrakis complexes such as tetrakis(hexafluoroacetonate) neodymium (III). Other examples are $Nd[C_8F_{17}SO_2NSO_2C_8F_{17}]_3$, $Nd[C_4F_9SO_2NSO_2C_4F_9]_3$, $Nd[C_6F_5SO_2NSO_2C_6F_5]_3$, $Nd[C_4F_9SO_2NSO_2C_6F_5]_3$, $Nd[C_4F_9SO_2NSO_2C_8F_{17}]_3$, $Nd[C_6F_{13}SO_2NSO_2C_6F_{13}]_3$, $Nd[C_2F_5SO_2NSO_2C_2F_5]_3$, $Nd[CF_3SO_2NSO_2CF_3]_3$, $Nd[C_4F_9SO_2NCOC_3F_7]_3$, $Nd[C_4F_9SO_2NCOCF_3]_3$, $Nd[O_3SC_8F_{17}]_3$, $Nd[O_3SCF_3]_3$ and the like.

For optical amplifier application for optical communication, praseodymium salts, neodymium salts, erbium salts and complexes thereof which have an ability of generating fluorescence in a near infrared region are particularly suitable. Among them, most suitable are neodymium salts, praseodymium salts, erbium salts and complexes thereof which have an ability of generating fluorescence having a wavelength of about 1,300 nm to about 1,550 nm which is a signal wavelength suitable for optical fibers of inorganic glass such as silica glass. Also europium salts and complexes thereof are most suitable for amplification of 650 nm band which is a visible wavelength to be used in case where an organic high molecular weight material is used as an optical fiber. For light emitter application, thulium salts for emitting blue light, terbium salts for emitting green light and europium salts for emitting red light are suitable.

It is preferable that the fluorine-containing resin composition of the present invention contains from 0.001 to 25% by weight (% by weight of ion, hereinafter the same with respect to the content of the rare earth metal ion (II)) of the rare earth metal ion (II). The content of the rare earth metal ion (II) varies depending on kinds of the fluorine-containing polymer (I) having functional group and rare earth metal ion (II) to be used. If the content of the rare earth metal ion (II) is less than 0.001% by weight, desired properties such as intended optical amplifying action are hardly exhibited. On the other hand, if the content of the rare earth metal ion (II) exceeds 25% by weight, there is a case where dispersibility of the rare earth metal ion is lowered. The both cases are not preferable. In applications for optical communication parts of optical amplifier and optical waveguide and for luminant, the content of the rare earth metal ion is selected in the range of preferably from 0.01 to 20% by weight, more preferably from 0.1 to 15% by weight, most preferably from 0.5 to 10% by weight from the viewpoint of fluorescence intensity. The content of the rare earth metal ion can be determined by burning the organic component in an electric oven of about 600° C. and measuring an ash content thereof or can be determined quantitatively by a physical and chemical method such as fluorescent X-ray analysis.

When the fluorine-containing resin composition of the present invention is used for optical communication, its absorption coefficient need be not more than 1 cm$^{-1}$ in each communication band, namely, in any of the wavelength ranges of from 600 to 900 nm, from 1,290 to 1,320 nm and from 1,530 to 1,570 nm to be amplified. If the absorption coefficient exceeds 1 cm$^{-1}$ in those wavelength ranges, the composition absorbs an optical signal itself and cannot function as an optical amplifier. Therefore it is demanded as mentioned above that the absorption coefficient of the fluorine-containing polymer (I) having functional group is not more than 1 cm$^{-1}$ in any of the wavelength ranges of from 600 to 900 nm, from 1,290 to 1,320 nm and from 1,530 to 1,570 nm to be amplified. In the composition containing the rare earth metal ion (II), since the rare earth metal ion exhibits sensitive absorption in a specific wavelength, there is a case where the absorption coefficient of the composition exceeds 1 cm$^{-1}$ in such a wavelength. Namely, a characteristic absorption wavelength of the rare earth metal ion is, for example, 980 nm, 1,480 nm, etc. in case of erbium, 820 nm, etc. in case of neodymium, and 1,017 nm, etc. in case of praseodymium. When the composition is used as a visible light emission material, it is desirable that the composition is transparent in a visible band.

In the optical amplifier such as an optical fiber amplifier which functions to recover attenuation of communication light, there is used an amplification action in which an excitation radiation (pumping radiation) effectively pumping the rare earth metal ion which emits fluorescence of the wavelength of communication light is passed continuously and by phenomenon of stimulated emission caused by a communication light pulse, fluorescence having the same pulse waveform as the communication light pulse is generated. Therefore in case where the fluorine-containing resin composition of the present invention is used for optical amplifier application, it is necessary for the composition to have an ability of generating fluorescence in pumping radiation derived from the rare earth metal ion (II).

Also in a light emitting device, the composition contains a rare earth metal ion generating fluorescence at a wavelength of from visible light to near infrared light, and luminescence having an intended wavelength is obtained by irradiating with pumping radiation. Therefore in case where the fluorine-containing resin composition of the present invention is used for luminant application, it is necessary for the composition to have an ability of generating fluorescence in pumping radiation derived from the rare earth metal ion (II).

From this point of view, the fluorine-containing resin composition to be used for optical amplification materials and light emission materials may be a fluorine-containing resin composition, in which:

(a) the fluorine-containing polymer (I) having functional group is the specific fluorine-containing polymer having functional group of the above-mentioned formula (1) which has at least one ketone structure in its side chain, (b) a maximum absorption coefficient of the fluorine-containing polymer (I) having functional group is not more than 1 $cm^{-1}$ in the wavelength ranges of from 1,290 to 1,320 nm and/or from 1,530 to 1,570 nm and/or from 600 to 900 nm, and (c) the rare earth metal ion is at least one selected from the group consisting of erbium (Er) ion, thulium (Tm) ion, praseodymium (Pr) ion, holmium (Ho) ion, neodymium (Nd) ion, europium (Eu) ion, dysprosium (Dy) ion, samarium (Sm) ion and cerium (Ce) ion.

The fluorine-containing resin composition of the present invention can be prepared by mixing the rare earth metal ion (II) to the fluorine-containing polymer (I) having functional group. The method of introducing the rare earth metal ion (II) to the fluorine-containing polymer (I) having functional group is not limited particularly. The above-mentioned compound or complex containing the rare earth metal ion (II) may be dissolved or dispersed in the fluorine-containing polymer (I) having functional group, or the rare earth metal ion (II) may be carried on the functional group (particularly ketone group) of the fluorine-containing polymer (I) having functional group by ionic bond, coordinate bond or clathration.

For example, there are (1) a method of adding the compound or complex containing the above-mentioned rare earth metal ion (II) to the fluorine-containing monomer having functional group and giving the structural unit M and then preparing the fluorine-containing polymer (I) having functional group by a known synthesizing method such as melt polymerization or anion polymerization, (2) a method of adding and mixing the compound or complex containing the above-mentioned rare earth metal ion (II) to a solution obtained by dissolving the fluorine-containing polymer (I) having functional group in a solvent and then eliminating the solvent, (3) a method of melt-kneading the fluorine-containing polymer (I) having functional group and the compound or complex containing the rare earth metal ion (II), and the like method.

Among those methods, the method (2) is most suitable from the point of good dispersibility of the compound or complex containing the rare earth metal ion (II) in the fluorine-containing polymer having functional group. Particularly suitable is the method of dissolving the fluorine-containing polymer having functional group in a solution containing the compound or complex containing the rare earth metal ion and then heating up the obtained uniform solution to distill off the solvent. The composition in the form of solution or dispersion may be used as a starting solution in a process for forming an optical device without distilling off the solvent.

Therefore it is preferable that the fluorine-containing polymer (I) having functional group is soluble in organic solvents, particularly general-purpose solvents, for example, in at least one of ketone solvents, acetic acid ester solvents, alcohol solvents and aromatic solvents or solvent mixtures containing at least one of the above-mentioned general-purpose solvents. Solubility in the solvent can be properly adjusted by selecting kind and content of the structural unit M and kind of the copolymerizable structural unit A to be used as case demands.

Being soluble in a solvent according to the present invention means that the fluorine-containing prepolymer is soluble in a solvent in an amount of 10 mg/g, preferably 20 mg/g, more preferably 50 mg/g.

When the polymer is soluble in a general-purpose solvent, it is advantageous because at forming an optical devices such as a optical amplification device using the composition of the present invention, spin coating and dip coating can be carried out at forming a film on a substrate. It is also advantageous particularly for forming a waveguide for a single mode in which a highly precise control of a coating thickness is required because a material excellent in film forming property and homogeneity can be provided and also from the viewpoint of productivity at forming optical devices such as optical amplification device.

Examples of the solvent are, for instance, cellosolve solvents such as methyl cellosolve, ethyl cellosolve, methyl cellosolve acetate and ethyl cellosolve acetate; ester solvents such as diethyl oxalate, ethyl pyruvate, ethyl-2-hydroxybutyrate, ethyl acetoacetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate and dipropylene glycol dimethyl ether; ketone solvents such as 2-hexanone, cyclohexanone, methyl amino ketone and 2-heptanone; alcohol solvents such as methanol, ethanol, propanol, isopropanol and butanol; aromatic hydrocarbons such as toluene and xylene; solvent mixtures of two or more thereof and the like.

Also in order to enhance solubility of the fluorine-containing polymer (I) having functional group, a fluorine-containing solvent may be used as case demands.

Examples of the fluorine-containing solvent are, for instance, $CH_3CCl_2F$ (HCFC-141b), a mixture of $CF_3CF_2CHCl_2$ and $CClF_2CF_2CHClF$ (HCFC-225), perfluorohexane, perfluoro(2-butyltetrahydrofuran), methoxy-nonafluorobutane, 1,3-bistrifluoromethylbenzene, and in addition, fluorine-containing alcohols such as:

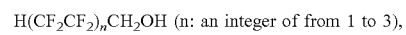

$H(CF_2CF_2)_nCH_2OH$ (n: an integer of from 1 to 3),

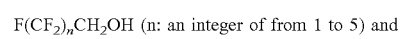

$F(CF_2)_nCH_2OH$ (n: an integer of from 1 to 5) and

$CF_3CH(CF_3)OH$, benzotrifluoride, perfluorobenzene, perfluoro(tributylamine), ClCF$_2$CFClCF$_2$CFCl$_2$ and the like.

Those fluorine-containing solvents may be used solely, in a mixture thereof or in a mixture of one or more of the fluorine-containing solvents and non-fluorine-containing solvents.

Among them, ketone solvents, acetic acid ester solvents, alcohol solvents and aromatic solvents are preferred from the viewpoint of coatability and productivity of a coating film.

The fluorine-containing polymer (I) having functional group of the present invention may have a cure site in an amount where transparency in a near infrared region is not lowered. The cure site is not limited as far as the cure site forms bonding with the cure site itself, other kind of crosslinking site or a crosslinking agent. Examples of the cure site are a polymerizable group such as vinyl, acryloyl or epoxy; a curing group generating condensation reaction such as silanol, trifluorovinyl or a combination of an acid chloride and hydroxyl; a curing group generating addition reaction such as cyano and a combination of amino and —OCN; a chemical structure which generates an active chemical species such as radical, carbene and nitrene through decomposition by irradiation of light or with a heat initiator, such as iodine end structure, bromine end structure and azide structure.

The cure site may be present in the fluorine-containing polymer (I) having functional group, and is preferably present in a side chain of the polymer and/or at an end of a trunk chain of the polymer. Also the cure site may be contained in the above-mentioned Rf having a ketone group.

Among those cure sites, preferred is the polymerizable curing group from the viewpoint of good reaction efficiency, and particularly preferred is a cure site having an addition-polymerizable carbon—carbon double bond. Also it is preferable that the carbon—carbon double bond is present at an end of the polymer side chain. As the addition-polymerization reaction, any of radical polymerization, cation polymerization and anion polymerization may be used.

Examples of the curing group having addition-polymerizable carbon—carbon double bond being present at an end of the polymer side chain are as follows.

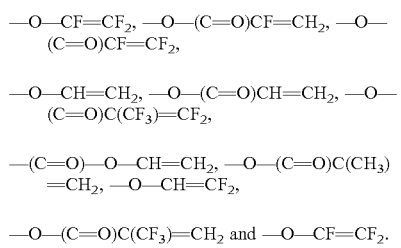

The fluorine-containing resin composition of the present invention can be obtained even from only the fluorine-containing polymer (I) having functional group and the rare earth metal ion (II) and may be in the form of a photo-curable composition by adding thereto an active energy curing initiator (III) such as a photoradical generator (III-1) or a photoacid generator (III-2) when the fluorine-containing polymer (I) having functional group has a cure site.

The active energy curing initiator (III) generates a radical or a cation (acid) only by irradiation of an active energy ray, for example, an electromagnetic wave having a wavelength of not more than 350 nm such as ultraviolet light, electron beam, X-ray, γ-ray or the like and functions as a catalyst for initiating curing (crosslinking reaction) through the cure site of the fluorine-containing polymer. Usually an initiator generating a radical or a cation (acid) by irradiation of ultraviolet light is used and particularly one which generates a radical is used.

When the fluorine-containing polymer (I) having functional group has the cure site, according to the fluorine-containing resin composition of the present invention for optical amplification materials and light emission materials, the curing reaction can be initiated easily with the above-mentioned active energy rays, heating at high temperature is not necessary and the curing reaction can be carried out at relatively low temperature. Therefore the fluorine-containing resin composition is preferred since it can be applied on a substrate, for example, a transparent resin substrate which has a low heat resistance and is apt to be deformed, decomposed or colored due to heat.

In the composition of the present invention, the active energy curing initiator (III) is optionally selected depending on kind (radical-reactive or cation (or acid)-reactive) of the cure site in the fluorine-containing polymer (I) having functional group, kind (wavelength range, etc.) of the active energy ray, intensity of irradiation, etc.

Generally examples of the initiator (photo-radical generator) which functions to cure the fluorine-containing polymer (I) having functional group and a radical-reactive cure site with active energy ray in an ultraviolet region are, for instance, those mentioned below.

Acetophenone Initiators

Acetophenone, chloroacetophenone, diethoxyacetophenone, hydroxyacetophenone, α-aminoacetophenone and the like.

Benzoin Initiators

Benzoin, benzoinmethylether, benzoinethylether, benzoinisopropylether, benzoinisobutylether, benzyldimethylketal and the like.

Benzophenone Initiators

Benzophenone, benzoyl benzoate, methyl-o-benzoylbenzoate, 4-phenylbenzophenone, hydroxybenzophenone, hydroxy-propylbenzophenone, acrylated benzophenone, Michler's ketone and the like.

Thioxanthone Initiators

Thioxanthone, chlorothioxanthone, methylthioxanthone, diethylthioxanthone, dimethylthioxanthone and the like.

Other Initiators

Benzyl, α-acyloxime ester, acylphosphine oxide, glyoxyester, 3-ketocoumaran, 2-ethylanthraquinone, camphorquinone, anthraquinone and the like.

Also as case demands, an auxiliary for photo-initiation such as amines, sulfones or sulfines may be added.

Also examples of the initiator which cures the fluorine-containing polymer (I) having functional group and a cation (or acid)-reactive cure site are those mentioned below.

Onium Salts

Iodonium salt, sulfonium salt, phosphonium salt, diazonium salt, ammonium salt, pyridinium salt and the like.

Sulfone compounds

β-ketoester, β-sulfonylsulfone, α-diazo compounds thereof and the like.

Sulfonic Acid Esters

Alkylsulfonic acid ester, haloalkylsulfonic acid ester, arylsulfonic acid ester, iminosulfonate and the like.

Others

Sulfone imide compounds, diazomethane compounds and the like.

Examples of the radical-reactive cure site are, for instance, those represented by the formulae:

—O—(C=O)CF=CH$_2$, —O—(C=O)CH=CH$_2$,
—O—(C=O)C(CF$_3$)=CH$_2$ and the like, and examples of the cation-reactive cure site are, for instance, those represented by the formulae:

—O—CH=CH$_2$, —(C=O)—O—CH=CH$_2$ and the like.

The fluorine-containing resin composition of the present invention for optical amplification materials and light emission materials comprises, as mentioned above, the fluorine-containing polymer (I) having functional group and the rare earth metal ion (II) in case where the fluorine-containing polymer (I) having functional group has a cure site. Further if necessary, an active energy curing initiator (III) may be added to form a curable fluorine-containing resin composition, and thereto may be added a solvent mentioned infra to make a solution of fluorine-containing resin composition for coating. Further thereto may be added a curing agent.

Preferred curing agents are those which have at least one carbon—carbon unsaturated bond and can be polymerized with a radical or an acid. Examples thereof are radically polymerizable monomers such as acrylic monomers and cationically polymerizable monomers such as vinyl ether monomers. Those monomers may be monofunctional monomers having one carbon—carbon double bond or polyfunctional monomers having two or more carbon—carbon double bonds.

Those so-called curing agents having a carbon—carbon unsaturated bond can react by a radical or a cation generated by a reaction of the active energy curing initiator in the composition of the present invention with an active energy ray such as light, and can be crosslinked with the carbon—carbon double bond of the fluorine-containing polymer (I) by copolymerization in case where the fluorine-containing polymer (I) having functional group in the composition of the present invention has such a carbon—carbon double bond as a cure site.

Examples of the monofunctional acrylic monomer are acrylic acid, acrylic acid esters, methacrylic acid, methacrylic acid esters, α-fluoroacrylic acid, α-fluoroacrylic acid esters, maleic acid, maleic anhydride, maleic acid esters and (meth)acrylic acid esters having epoxy, hydroxyl, carboxyl or the like.

Among them, particularly preferred are acrylate monomers having fluoroalkyl group in order to maintain a high near infrared transparency of a cured article. For example, preferred are compounds represented by the formula:

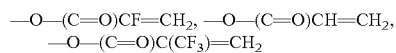

wherein X is H, CH$_3$ or F; Rf is a fluorine-containing alkyl group having 2 to 40 carbon atoms or a fluorine-containing alkyl group having 2 to 100 carbon atoms and ether bond.

Examples thereof are:

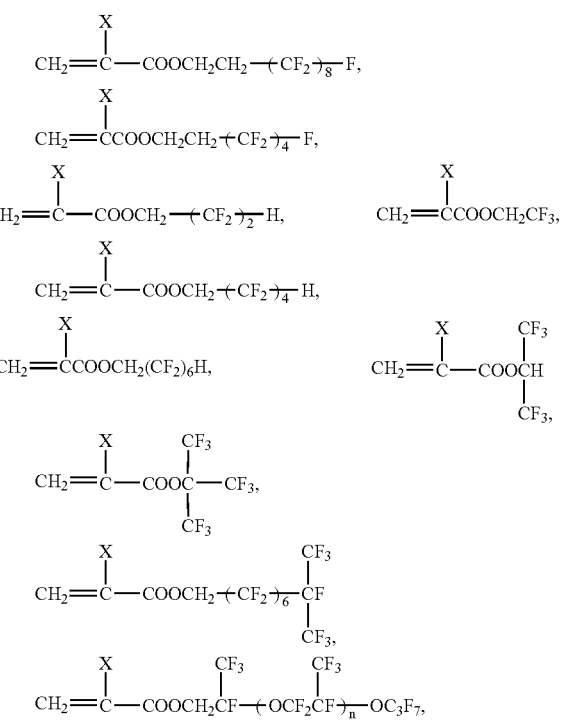

(X: H, CH$_3$ or F; n: an integer of from 1 to 5)

and the like.

As the polyfunctional acrylic monomer, there are generally known compounds obtained by replacing hydroxyl groups of polyhydric alcohols such as diol, triol and tetraol with acrylate groups, methacrylate groups or α-fluoroacrylate groups.

Examples thereof are compounds obtained by replacing two or more hydroxyl groups of polyhydric alcohols such as 1,3-butanediol, 1,4-butanediol, 1,6-hexanediol, diethylene glycol, tripropylene glycol, neopentyl glycol, trimethylol propane, pentaerythritol and dipentaerythritol with any of acrylate groups, methacrylate groups or α-fluoroacrylate groups.

Also there can be used polyfunctional acrylic monomers obtained by replacing two or more hydroxyl groups of polyhydric alcohols having a fluorine-containing alkyl group or a fluorine-containing alkylene group with acrylate groups, methacrylate groups or α-fluoroacrylate groups. Those monomers are preferred particularly from the point that a high near infrared transparency of a cured article can be maintained.

Preferable examples thereof are compounds having structures obtained by replacing two or more hydroxyl groups of fluorine-containing polyhydric alcohols represented by the formulae:

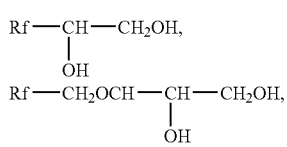

(Rf is a fluorine-containing alkyl group having 1 to 40 carbon atoms)

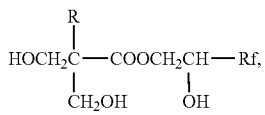

(Rf is a fluorine-containing alkyl group having 1 to 40 carbon atoms; R is H or an alkyl group having 1 to 3 carbon atoms)

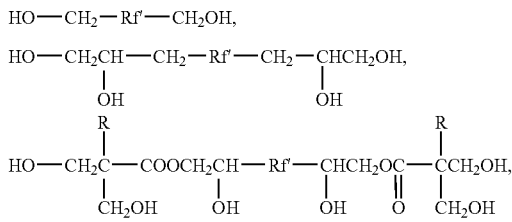

(Rf' is a fluorine-containing alkylene group having 1 to 40 carbon atoms;

R is H or an alkyl group having 1 to 3 carbon atoms), with acrylate groups, methacrylate groups or α-fluoroacrylate groups.

When those exemplified monofunctional and polyfunctional acrylic monomers are used as the curing agent for the composition of the present invention, particularly preferred are α-fluoroacrylate compounds from the viewpoint of good curing reactivity.

In the fluorine-containing resin composition of the present invention for optical amplification materials and light emission materials, an adding amount of the active energy curing initiator is optionally selected depending on the content of the cure sites in the fluorine-containing polymer (I), an amount of the curing agent and further kinds of the initiator and active energy and an amount of irradiation energy (intensity and time) and also depending on whether or not the above-mentioned curing agent is used. When the curing agent is not used, the amount of the initiator is from 0.01 to 30 parts by weight, preferably from 0.05 to 20 parts by weight, most preferably from 0.1 to 10 parts by weight based on 100 parts by weight of the fluorine-containing polymer (I).

Concretely the amount of the initiator is from 0.05 to 50% by mole, preferably from 0.1 to 20% by mole, most preferably from 0.5 to 10% by mole based on the content (the number of moles) of the cure sites contained in the fluorine-containing polymer (I).

When the curing agent is used, the amount of the initiator is from 0.05 to 50% by mole, preferably from 0.1 to 20% by mole, most preferably from 0.5 to 10% by mole based on the total number of moles of the content (the number of moles) of the cure sites contained in the fluorine-containing polymer (I) and the number of moles of the carbon—carbon unsaturated bonds of the curing agent.

To the composition of the present invention may be added various additives as case demands in addition to the above-mentioned compounds.

Examples of the additives are, for instance, a leveling agent, viscosity control agent, light-stabilizer, moisture absorbing agent, pigment, dye, reinforcing agent and the like.

The present invention also relates to optical devices, namely optical amplification device and light emitting device in which the fluorine-containing resin composition explained above is used on the core portion thereof.

For producing the optical devices, namely optical amplification device and light emitting device using the fluorine-containing resin composition of the present invention, there can be employed a method of preparing a coating solution by dissolving the fluorine-containing resin composition in a proper solvent, applying the coating solution on a given substrate to form a film of the fluorine-containing composition of the present invention and then carrying out patterning of the film through usual method into the form of optical amplification portion or light emission portion, thereby forming the optical amplification portion or light emission portion.

The coating solution which contains the composition of the present invention for forming the pattern of optical amplification portion or light emission portion may contain, as case demands, additives such as an active energy curing initiator, curing agent, leveling agent and light stabilizer. The solvent for preparing the coating solution is not limited particularly as far as the composition of the present invention is uniformly dissolved or dispersed therein. Particularly preferred are the above-mentioned general-purpose solvents which uniformly dissolve the fluorine-containing polymer (I) having functional group.

The optical amplification device is a kind of optical waveguide device having a core portion and a clad portion and is generally a device which amplifies an intensity of an optical signal while the signal is passed through the core portion of the optical waveguide formed on a substrate. The core portion of the optical amplification device need be formed using a material having optical amplifying action.

The optical amplification device of the present invention has the core portion (a portion of the optical waveguide having optical amplifying action) made of the above-mentioned fluorine-containing resin composition of the present invention containing the rare earth metal ion.

When the fluorine-containing resin composition of the present invention is used on the core portion of the optical amplification device, a proper clad material is required. As the material for the clad portion, it is necessary to use one having a refractive index lower than that of the material for the core portion. When the fluorine-containing resin composition of the present invention is used on the core portion, the material for the clad portion is not limited particularly, and conventional organic materials are used. It is a matter of course that the fluorine-containing polymer (I) having functional group and not containing the rare earth metal ion may be used.

The light emitting device of the present invention encompasses, for example, electroluminescence device, luminescent organic polymer, light emission diode, optical fiber laser, laser device, optical fiber, back lighting system for liquid crystal displays, photodetector and the like and can be applied on a large size display, illumination, liquid crystal, photo-disk, laser printer, laser for medical use, laser processing machine, printing machine, copying machine, etc.

In case of the light emitting device comprising the core portion and clad portion, like the optical amplifying device, it is possible that the light emission material of the present invention is used on the core portion, and on the clad portion is used a conventional organic material, for example, the above-mentioned fluorine-containing polymer (I) having functional group as it is.

The optical amplifying device and light emitting device of the present invention can be produced by known method except that the fluorine-containing resin composition of the present invention is used on the core portion.

General production steps of optical waveguide device (optical amplifying device and light emitting device) are shown in FIG. 1. First, a lower clad layer 2 is formed on a substrate 1. The clad layer 2 is formed using a material having a refractive index lower than that of a core layer 3. Then the core layer 3 is formed on the lower clad layer 2 using the fluorine-containing resin composition of the present invention. Further a mask pattern 4 of an optical waveguide is formed on the core layer 3 through a photolithograph method. On the core layer 3 having the mask pattern 4 formed thereon, etching is carried out through RIE (reactive ion etching) method to form a core pattern 5 of the optical waveguide. After removing the mask, an upper clad layer 6 is formed on the core pattern 5 of the optical waveguide. Thus the optical device (optical amplifying device or light emitting device) is formed.

Also the optical amplifying device and light emitting device of the present invention can provide a multi-functional optical circuit when integrated with other optical devices. Examples of the other optical device are a photo-switch, photo-filter, optical branch device, etc. Particularly preferred is an optical circuit having, on the same substrate, the optical amplifying device of the present invention and an optical branching device having a N-branching waveguide (N represents an integer of 2 or more) which is made of the same material as a core portion of the optical amplifying device and is connected to an output end of the core portion because the optical circuit can be used as a branch device assuring a small loss of light.

The present invention is then explained by means of examples, but is not limited to them.

In the following Examples and Preparation Examples, equipment and measuring conditions used for evaluation of physical properties are as follows.

(1) NMR: NMR analyzer is AC-300 available from BRUKER CO., LTD. Measuring conditions of $^1$H-NMR: 300 MHz (tetramethylsilane=0 ppm) Measuring conditions of $^{19}$F-NMR: 300 MHz (trichlorofluoromethane=0 ppm)

A ratio of conversion to $CH_2=CF-C(=O)-$ (α-fluoroacryloyl) (5.2 to 5.8 ppm (2H)) can be calculated from the data of $^1$H-NMR analysis, and a ratio of α-fluoroacryloyl group (−116 to −118 ppm (1F))/$CF_2$ and $CF_3$ in a side chain (−85 to −75 ppm (10F)) can be calculated from the data of $^{19}$F-NMR analysis by usual method.

(2) IR analysis: Measuring is carried out at room temperature with a Fourier-transform infrared spectrophotometer 1760X available from Perkin Elmer Co., Ltd.

(3) GPC: A number average molecular weight is calculated from data measured by gel permeation chromatography (GPC) by using GPC HLC-8020 available from Toso Kabushiki Kaisha and columns available from Shodex Co., Ltd. (one GPC KF-801, one GPC KF-802 and two GPC KF-806M were connected in series) and flowing tetrahydrofuran (THF) as a solvent at a flowing rate of 1 ml/minute.

PREPARATION EXAMPLE 1

(Synthesis of Homopolymer of Fluorine-Containing Allyl Ether Having COOH Group)

A 100 ml four-necked glass flask equipped with a stirrer and thermometer was charged with 20.0 g of 9H,9H-perfluoro-2,5-dimethyl-3,6-dioxa-8-nonenoic acid:

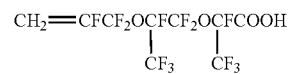

and 8.5 g of a perfluorohexane solution of 8.0% by weight of:

and after the inside of the flask was sufficiently replaced with nitrogen gas, stirring was carried out at 30° C. for five hours in nitrogen gas stream and thereby a solid having a high viscosity was produced.

The obtained solid was dissolved in acetone and poured into perfluorohexane, followed by separating and vacuum-drying to obtain 15.09 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having carboxyl at an end of its side chain. The number average molecular weight of the polymer was 7,000 according to the GPC analysis using tetrahydrofuran (THF) as a solvent and the weight average molecular weight thereof was 9,000.

PREPARATION EXAMPLE 2

(Synthesis of Copolymer of Fluorine-Containing Allyl Ether Having COOH Group)

A 100 ml four-necked glass flask equipped with a stirrer and thermometer was charged with 10.1 g of 9H,9H-perfluoro-2,5-dimethyl-3,6-dioxa-8-nonenoic acid:

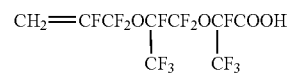

and 9.6 g of methyl 9H,9H-perfluoro-2,5-dimethyl-3,6-dioxa-8-nonenoate:

followed by stirring sufficiently and then adding 2.0 g of a perfluorohexane solution of 8.0% by weight of:

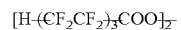

and after the inside of the flask was sufficiently replaced with nitrogen gas, stirring was carried out at 20° C. for 20 hours in nitrogen gas stream and thereby a solid having a high viscosity was produced.

The obtained solid was dissolved in acetone and then poured into a solution of HCFC225/n-hexane=1/1, followed by separating and vacuum-drying to obtain 13.2 g of a transparent colorless polymer.

According to $^{19}$F-NMR, $^1$H-NMR and IR analyses, the polymer was a fluorine-containing polymer comprising the structural unit of the above-mentioned fluorine-containing allyl ether having carboxyl and the structural unit of the fluorine-containing allyl ether having methyl ester structure.

The ratio thereof was 42:58 (mole ratio) according to NMR analysis.

The number average molecular weight of the polymer was 9,000 according to the GPC analysis using tetrahydrofuran (THF) as a solvent and the weight average molecular weight thereof was 13,000.

PREPARATION EXAMPLE 3

(Synthesis of Fluorine-Containing Allyl Ether Having COCL Group)

A mixture of 9H,9H-perfluoro-2,5-dimethyl-3,6-dioxa-8-nonenoic acid (422 g, 1.0 mole):

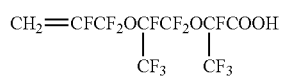

and dimethylformamide (7.4 g, 0.1 mole) was put in a reaction vessel and thereto was added dropwise SOCl$_2$ (143 g, 1.2 mole) at 80° C. with stirring. Thereafter the reaction solution was heated up to 100° C. and stirred for six hours. A distiller was fit on the reaction vessel and SOCl$_2$ was distilled off from the reaction solution under reduced pressure. Then the pressure was further reduced and a crude product of 9H,9H-perfluoro-2,5-dimethyl-3,6-dioxa-8-nonenoic acid chloride was removed. The solution was washed with concentrated sulfuric acid and distilled under reduced pressure of 60 mmHg. Thus 9H,9H-perfluoro-2,5-dimethyl-3,6-dioxa-8-nonenoic acid chloride having a boiling point of 50° C. and represented by:

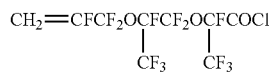

(441 g, 0.91 mole, yield: 91%) was obtained.

PREPARATION EXAMPLE 4

(Synthesis of Fluorine-Containing Allyl Ether Having CO Group)

60% Sodium hydride (1.9 g, 48 mmol) was subjected to suspension in THF (100 ml) and thereto was added dropwise hexafluoroacetylacetone (10.0 g, 48 mmol) at 0° C. After stirring at 0° C. for 10 minutes, the stirring was further continued at room temperature for 20 minutes. Thereafter the reaction solution was cooled to −78° C. and at that temperature, copper iodide (25 g, 131 mmol) was added. The solution was stirred at −78° C. for 10 minutes and further at −30° C. for 10 minutes. The reaction solution was again cooled to −78° C. and thereto was added dropwise 9H,9H-perfluoro-2,5-dimethyl-3,6-dioxa-8-nonenoic acid chloride (17.6 g, 40 mole) over one hour. The reaction mixture was subjected to reaction over six hours while heating until the temperature thereof reached 10° C. The reaction solution was subjected to filtration with Celite and to the obtained solution was added ether, followed by washing with 1N hydrochloric acid and then with water and drying with anhydrous magnesium sulfate. The solvent was evaporated off under reduced pressure, followed by subjecting to distillation to obtain 3H, 12H, 12H-perfluoro-5,8-dimethyl-6,9-dioxa-3-trifluoroacetyl-11-dodecene-2,4-dione represented by:

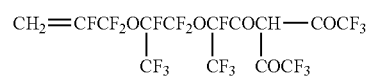

(14.3 g, 23.3 mmol, yield: 58%) at 0.5 mmHg at 60° C.

PREPARATION EXAMPLE 5

(Synthesis of Fluorine-Containing Allyl Ether Homopolymer Having CO Group)

A 100 ml four-necked glass flask equipped with a stirrer and thermometer was charged with 10.0 g of 3H, 12H, 12H-perfluoro-5,8-dimethyl-6,9-dioxa-3-trifluoroacetyl-11-dodecene-2,4-dione:

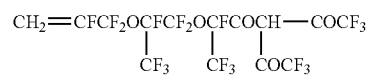

and 5.3 g of a perfluorohexane solution of 8.0% by weight of:

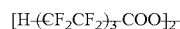

and after the inside of the flask was sufficiently replaced with nitrogen gas, stirring was carried out at 30° C. for five hours in nitrogen gas stream and thereby a solid having a high viscosity was produced.

The obtained solid was dissolved in acetone and then poured into perfluorohexane, followed by separating and vacuum-drying to obtain 7.3 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having ketone group at an end of its side chain. The number average molecular weight of the polymer was 3,000 according to the GPC analysis using tetrahydrofuran (THF) as a solvent and the weight average molecular weight thereof was 4,000.

PREPARATION EXAMPLE 6

Comparative Preparation Example

A 100 ml four-necked glass flask equipped with a stirrer and thermometer was charged with 10.0 g of a compound not having functional group and represented by the following formula:

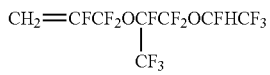

and 4.1 g of a perfluorohexane solution of 8.0% by weight of:

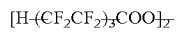

and after the inside of the flask was sufficiently replaced with nitrogen gas, stirring was carried out at 30° C. for 6.5 hours in nitrogen gas stream and thereby a solid having a high viscosity was produced.

The obtained solid was dissolved in acetone and then poured into perfluorohexane, followed by separating and vacuum-drying to obtain 6.62 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether. The number average molecular weight of the polymer was 13,000 according to the GPC analysis using tetrahydrofuran (THF) as a solvent and the weight average molecular weight thereof was 20,000.

EXAMPLE 1

(Preparation of Fluorine-Containing Resin Composition Containing Rare Earth Metal)

A 100 ml four-necked glass flask equipped with a stirrer and thermometer was charged with 2.09 g of the fluorine-containing allyl ether homopolymer having COOH group which was obtained in Preparation Example 1 and 15 g of methanol, and a solution obtained by dissolving 0.62 g (1.54 mmol) of europium acetate (III) tetrahydrate (Eu(CH$_3$COO)$_3$.4H$_2$O) in 8 g of water was added thereto dropwise over five minutes with stirring. After completion of the addition, 2-hour stirring was continued, followed by allowing to stand for 30 minutes to precipitate a viscous solid. The supernatant methanol solution was removed by decantation and the solid was washed with acetone three times and then vacuum-dried at 60° C. for 12 hours to obtain 1.93 g of a colorless transparent solid.

EXAMPLE 2

(Preparation of Fluorine-Containing Resin Composition Containing Rare Earth Metal)

A 100 ml four-necked glass flask equipped with a stirrer and thermometer was charged with 2.04 g of the fluorine-containing allyl ether copolymer having COOH group which was obtained in Preparation Example 1 and 15 g of methanol, and a solution obtained by dissolving 0.61 g (1.61 mmol) of erbium chloride hexahydrate (ErCl$_3$.6H$_2$O) in 3 g of methanol was added thereto dropwise over five minutes with stirring. After completion of the addition, 2-hour stirring was continued, followed by heating up to 60° C. while concentrating the solution with an evaporator. The heating was continued for one hour to obtain 2.19 g of a light-pink solid.

EXAMPLE 3

(Preparation of Fluorine-Containing Resin Composition Containing Rare Earth Metal)

A 100 ml four-necked glass flask equipped with a stirrer and thermometer was charged with 2.05 g of the fluorine-containing allyl ether copolymer having COOH group which was obtained in Preparation Example 2 and 15 g of methanol, and a solution obtained by dissolving 0.62 g (1.54 mmol) of europium acetate (III) tetrahydrate (Eu(CH$_3$COO)$_3$.4H$_2$O) in 8 g of water was added thereto dropwise over five minutes with stirring. After completion of the addition, 2-hour stirring was continued, followed by allowing to stand for 30 minutes to precipitate a viscous solid. The supernatant methanol solution was removed by decantation and the solid was washed with acetone three times and then vacuum-dried at 60° C. for 12 hours to obtain 1.74 g of a colorless transparent solid.

EXAMPLE 4

(Preparation of Fluorine-Containing Resin Composition Containing Rare Earth Metal)

A 100 ml four-necked glass flask equipped with a stirrer and thermometer was charged with 2.00 g of the fluorine-containing allyl ether homopolymer having CO group which was obtained in Preparation Example 5 and 15 g of methanol, and a solution obtained by dissolving 0.62 g (1.54 mmol) of europium acetate (III) tetrahydrate (Eu(CH$_3$COO)$_3$.4H$_2$O) in 8 g of water was added thereto dropwise over five minutes with stirring. After completion of the addition, 2-hour stirring was continued, followed by allowing to stand for 30 minutes to precipitate a viscous solid. The supernatant methanol solution was removed by decantation and the solid was washed with acetone three times and then vacuum-dried at 60° C. for 12 hours to obtain 2.03 g of a colorless transparent solid.

COMPARATIVE EXAMPLE 1

(Preparation of Fluorine-Containing Resin Composition not Having Functional Group)

A 100 ml four-necked glass flask equipped with a stirrer and thermometer was charged with 2.00 g of the fluorine-containing allyl ether homopolymer not having functional group which was obtained in Preparation Example 6 and 15 g of methanol, and a solution obtained by dissolving 0.62 g (1.54 mmol) of europium acetate (III) tetrahydrate (Eu(CH$_3$COO)$_3$.4H$_2$O) in 8 g of water was added thereto dropwise over five minutes with stirring. After completion of the addition, 2-hour stirring was continued, followed by allowing to stand for 30 minutes to precipitate a viscous solid. The supernatant methanol solution was removed by decantation and the solid was washed with acetone three times and then vacuum-dried at 60° C. for 12 hours. The obtained product got turbid in white and could not be used for optical applications.

REFERENCE EXAMPLE 1

(Evaluation of Physical Properties of Fluorine-Containing Polymer Having Functional Group)

(1) Preparation of Fluorine-Containing Resin Composition

The fluorine-containing polymers having functional group which were obtained in Preparation Examples 1, 2 and 5, respectively were dissolved in methyl ethyl ketone (MEK) to adjust concentrations of the polymers to 50% by weight.

(2) Production of Film of Fluorine-Containing Polymer Having Functional Group

The 50% MEK solution of the fluorine-containing polymer having functional group was coated on a PET film with an applicator so that an intended coating thickness after the drying could be obtained. After vacuum-drying at 50° C. for ten minutes, the obtained cast film was peeled from the PET film. Thus the films having a thickness of about 1 mm and about 100 μm were obtained.

(3) Measurement of Physical Properties of Film

With respect to the obtained films, the following physical properties were evaluated.

(i) Measurement of Absorption Coefficient

A spectral transmittance curve of about 1 mm thick film at a wavelength of from 300 to 1,700 nm was determined with a self-recording spectrophotometer (U-3410 available from Hitachi, Ltd.). The absorption coefficient was calculated from the obtained spectrum using the following equation.

Absorption coefficient=Absorbance/Thickness of sample film

The results are shown in Table 1.

(ii) Measurement of Refractive Index

A refractive index of about 100 μm thick film was measured using an Abbe's refractometer at 25° C. with light having a wavelength of 550 nm. The results are shown in Table 1.

(iii) Thermal Characteristic (DSC)

Thermal characteristics were measured at a temperature raising rate of 10° C./min using a differential calorimeter (DSC-50 available from Shimadzu Corporation), and no peak indicating a clear crystalline melting point was recognized and any films were non-crystalline.

(iv) Thermal Decomposition Temperature

A thermal decomposition temperature was measured in nitrogen gas atmosphere at a temperature raising rate of 10° C./min using a thermogravimeter (TGA-50 available from Shimadzu Corporation). The thermal decomposition temperature was evaluated by a temperature where the weight of the film was reduced by 10% by weight. The results are shown in Table 1.

TABLE 1

|  | Prep. Ex. 1 | Prep. Ex. 2 | Prep. Ex. 5 |
| --- | --- | --- | --- |
| Fluorine content (%) | 55 | 56 | 59 |
| Absorption coefficient (cm$^{-1}$) | | | |
| 650 nm | 0.019 | 0.015 | 0.020 |
| 1,310 nm | 0.023 | 0.036 | 0.033 |
| 1,550 nm | 0.253 | 0.151 | 0.192 |
| Refractive index | 1.352 | 1.350 | 1.361 |
| Thermal decomposition temperature (° C.) | 260 | 272 | 310 |

Any of the obtained fluorine-containing polymers having functional group were materials having a high transparency and a high heat resistance.

EXAMPLE 5

(Evaluation of Physical Properties of Composition Comprising Fluorine-Containing Polymer Having Functional Group and Rare Earth Metal)

With respect to the fluorine-containing resin compositions obtained in Examples 1 to 3, the following physical properties were evaluated.

(i) Measurement of Fluorescent Spectrum

An absorption spectrum in the wavelength region of from 300 to 1,700 nm was measured with a self-recording spectrophotometer (U-34110 available from Hitachi, Ltd.) to obtain an absorption wavelength corresponding to a peak absorbance which was assumed to be an excitation wavelength for the fluorescence measurement mentioned below. In case of a sample containing europium, an absorption wavelength derived from europium which was obtained in the above-mentioned measurement of absorption spectrum was assumed to be an excitation wavelength, and a fluorescent spectrum in the wavelength region of from 300 to 700 μm was measured with a fluorophotometer (F-3040 available from Hitachi, Ltd.). In case of a sample containing erbium, since it was known that a fluorescence around 1,500 nm in a near infrared region was generated, whether or not there was a near infrared luminescence was observed with a near infrared camera (C-5840 available from Hamamatsu Photonics Kabushiki Kaisha). The results are shown in Table 2.

(ii) Measurement of Refractive Index

A refractive index was measured using an Abbe's refractometer at 25° C. with light having a wavelength of 550 nm. The results are shown in Table 2.

(iii) Content of Cation of Rare Earth Element

A sample in an amount of about 2 g was measured precisely and subjected to ashing completely at 600° C. in an electric oven. The content of cation was calculated from a weight percent of the residue. The results are shown in Table 2.

(iv) Measurement of Fluorescence Life Time

A luminescence life time of the sample of Example 1 (time required when an intensity of luminescence just after excitation of pulse decreases to 37%) was measured and was about 0.8 ms. This luminescence life time is longer by about $10^4$ times to about $10^6$ times as compared with those of usual dye compounds (for example, fluorescein, rhodamine, etc.), which indicates that a state of inverted population necessary for exhibiting optical amplifying action can be easily formed.

(v) Durability Test

The sample of Example 1 was stored for one week under environment of a temperature of 80° C. and a humidity of 85%, but there was no lowering of transparency at all.

TABLE 2

|  | Ex. 1 | Ex. 2 | Ex. 3 |
| --- | --- | --- | --- |
| Rare earth metal | Eu | Er | Eu |
| Content of rare earth metal (% by weight) | 12 | 9 | 7 |
| Excitation wavelength (nm) | 394 | 980 | 394 |
| Fluorescence (wavelength, nm) | Recognized (615) | Recognized (1,550) | Recognized (615) |
| Refractive index | 1.38 | 1.39 | 1.38 |

PREPARATION EXAMPLE 7

(Synthesis of Fluorine-Containing Allyl Ether Homopolymer Having CO Group)

A four-necked glass flask was charged with 3.1 g of 3H,12H,12H-perfluoro-5,8-dimethyl-6,9-dioxa-3-trifluoroacetyl-11-dodecene-2,4-dione:

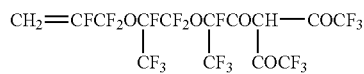

and 1.3 g of a perfluorohexane solution of 8% by weight of:

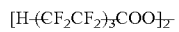

in the same manner as in Preparation Example 5 and after the inside of the flask was sufficiently replaced with nitrogen gas, stirring was carried out at 30° C. for five hours in nitrogen gas stream and thereby a solid having a high viscosity was produced.

The obtained solid was dissolved in acetone and poured into perfluorohexane, followed by separating and vacuum-drying to obtain 1.6 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having ketone group at an end of its side chain. The fluorine content thereof was 59% by weight. The number average molecular weight of the polymer was 6,000 according to the GPC analysis using tetrahydrofuran (THF) as a solvent and the weight average molecular weight thereof was 7,500.

EXAMPLE 6

The polymer obtained in Preparation Example 7 was dissolved in MEK so that the polymer content became 5% by weight. To the solution was added europium chloride and the europium ion content was adjusted to be 1% by weight based on the polymer. The solution was colorless and transparent. The solution was cast by usual method and the obtained polymer film was also colorless and transparent. The film emitted red light by irradiation of light having a wavelength of 394 nm which is an excitation wavelength of europium.

An integrated intensity of luminescence at 615 nm band which was measured at the excitation wavelength of 394 nm with a fluorescence spectrophotometer was as high as about 120 provided that a reference integrated intensity of europium chloride in an aqueous solution having a concentration of 0.3 mM was assumed to be 1.

COMPARATIVE EXAMPLE 2

(Dispersibility in High Molecular Weight Polymer not Having Functional Group)

Polymethyl methacrylate (ACRYPET available from Mitsubishi Rayon Co., Ltd.) was dissolved in butyl acetate so that the content thereof became 5% by weight. To the solution was added europium chloride and the content thereof was adjusted to be 1% by weight based on the polymer. The solution was colorless and transparent. However when the solution was cast by usual method, the obtained polymer film became turbid in white.

When an integrated intensity of luminescence at a wavelength band of 615 nm was measured with a fluorescence spectroscope (F-4010 available from Hitachi, Ltd.) using light having an excitation wavelength of 394 nm, the integrated intensity was as low as not more than 1 provided that a reference integrated intensity of europium chloride in an aqueous solution having a concentration of 0.3 mM was assumed to be 1.

COMPARATIVE EXAMPLE 3

(Dispersibility in Fluorine-Containing High Molecular Weight Polymer not Having Functional Group)

Teflon AF1600 (ACRYPET available from E.I. du Pont de Nemours and Company, a fluorine-containing high molecular weight polymer not having functional group) was dissolved in a fluorine-containing solvent (FC-75 available from Three M Co., Ltd.) so that the content thereof became 5% by weight. To the solution was added europium chloride and the content thereof was adjusted to be 1% by weight based on the polymer. The solution became turbid in white. When the solution was cast by usual method, the obtained polymer film also became turbid in white.

PREPARATION EXAMPLE 8

(Synthesis of Copolymer of Fluorine-Containing Allyl Ether Having CO Group and Hydroxyl)

A 100 ml four-necked glass flask equipped with a stirrer and thermometer was charged with 10.0 g of 3H,12H,12H-perfluoro-5,8-dimethyl-6,9-dioxa-3-trifluoroacetyl-11-dodecene-2,4-dione (fluorine-containing allyl ether having CO group):

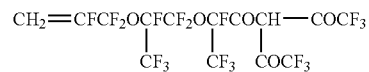

and 10.2 g of perfluoro(1,1,9,9-tetrahydro-2,5-bistrifluoromethyl-3,6-dioxanonenol (fluorine-containing allyl ether having OH group):

followed by stirring sufficiently and then adding 9.8 g of a perfluorohexane solution of 8.0% by weight of:

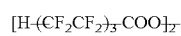

and after the inside of the flask was sufficiently replaced with nitrogen gas, stirring was carried out at 30° C. for 5 hours in nitrogen gas stream and thereby a solid having a high viscosity was produced.

The obtained solid was dissolved in acetone and then poured into perfluorohexane, followed by separating and vacuum-drying to obtain 14.7 g of a transparent colorless polymer.

According to $^{19}$F-NMR, $^1$H-NMR and IR analyses, the polymer was a fluorine-containing polymer consisting of the structural units of the above-mentioned fluorine-containing allyl ethers and having ketone group and hydroxyl at an end of its side chain. The ratio thereof was the fluorine-containing allyl ether having CO group/fluorine-containing allyl ether having hydroxyl=51/49 (% by mole). The number average molecular weight of the polymer was 3,200 according to the GPC analysis using tetrahydrofuran (THF) as a solvent and the weight average molecular weight thereof was 4,200.

PREPARATION EXAMPLE 9

(Synthesis of Copolymer of Fluorine-Containing Allyl Ether Having CO Group and Cure Site)

A 200 ml four-necked flask equipped with a reflux condenser, thermometer, stirrer and dropping funnel was charged with 80 ml of diethyl ether, 5.1 g of the fluorine-containing allyl ether copolymer having CO group and hydroxyl which was obtained in Preparation Example 8 and 2.1 g of pyridine, followed by cooling to 5° C. or lower with ice.

Then a solution obtained by dissolving 2.0 g of α-fluoroacrylic acid fluoride $CH_2$=CFCOF in 20 ml of diethyl ether was added thereto dropwise over about 30 minutes while stirring in nitrogen gas stream.

After completion of the addition, the flask temperature was raised to room temperature and the stirring was further continued for 4.5 hours.

The ether solution after the reaction was put in the dropping funnel, followed by washing with water, 2% hydrochloric acid solution, 5% NaCl solution and water and then drying with anhydrous magnesium sulfate. Then the ether solution was filtered for separation. Thus a fluorine-containing allyl ether copolymer having CO group and cure site was obtained.

According to $^{19}$F-NMR analysis of the ether solution, a conversion ratio was nearly 100% and the fluorine content was 57% by weight. According to IR analysis, an absorption of a carbon—carbon double bond was observed at 1,661 $cm^{-1}$, and according to DSC analysis, the copolymer was recognized to be non-crystalline.

EXAMPLE 7

(Production of Cured Film)

After MEK was added to the fluorine-containing polymer (ether solution) having CO group and a cure site (α-fluoroacryloyl group) and obtained in Preparation Example 9, ether was distilled off with an evaporator to adjust the concentration of polymer to 50% by weight. To the solution was added europium chloride and the concentration of europium ion was adjusted to be 5% by weight based on the polymer. Then 0.1 g of 2-hydroxy-2-methylpropiophenone was added as the active energy curing initiator to 10 g of the solution.

The solution was colorless and transparent. The solution was coated on an aluminum foil with an applicator so that the coating thickness became about 100 μm, followed by vacuum-drying at 50° C. for 10 minutes. After the drying, the coating film was irradiated with ultraviolet light with a high pressure mercury lamp at an intensity of 1,000 $mJ/cm^2 U$ and the aluminum foil was melted with diluted hydrochloric acid to obtain a sample film.

The obtained film was colorless and transparent. When the film was irradiated with light of 394 nm which is an excitation wavelength of europium, strong emission of red light arose.

EXAMPLE 8

(Production of Optical Amplification Device)

An optical amplification device was produced in the manner mentioned below.

The optical amplification device was produced using the fluorine-containing resin composition of Example 1 as a material for a core portion and the fluorine-containing polymer of Preparation Example 1 as a material for a clad portion.

Those two kinds of materials were dissolved in methyl isobutyl ketone to make respective solutions. First, the material for a clad portion was coated on a plastic substrate or a silicon substrate in a thickness of about 15 μm. After baking and drying, the material for a core portion was coated on the film of the material for the clad portion in a thickness of about 8 μm. Next, a mask pattern was formed on the core layer by photolithography using a photo mask 4. The core portion on which the mask pattern had been formed was subjected to etching by RIE method to form a core pattern. Thereafter the mask was removed and a linear rectangular pattern of the core portion having a length of 50 mm, a width of 8 μm and a height of 8 μm was formed. After forming the core portion, the clad portion material was coated on the core portion as explained in FIG. 1. Thus the optical amplification device was produced.

Next, a loss of light transmission of the produced optical amplification device was measured by passing light having a wavelength of 633 nm. The loss was 0.3 dB/cm.

When the thus produced optical amplification device was irradiated with light by an ultraviolet lamp and viewed from the top thereof, there was recognized a red linear pattern of light emission special to Eu ion in the form corresponding to the core portion. This indicates that the rare earth Eu ion necessary for optical amplifying action is contained only in the core portion.

According to the present invention, there can be obtained a suitable optical amplification material and light emission material which have a stable structure formed by a specific functional group and a rare earth metal ion while maintaining transparency in a region of from visible light to ultraviolet light. When this fluorine-containing resin composition is used, excellent optical amplification device and light emitting device can be produced by relatively easy steps.

What is claimed is:

1. A fluorine-containing polymer (I) having functional group represented by the formula (1):

   (1)

in which the structural unit M is a structural unit derived from a fluorine-containing ethylenic monomer and represented by the formula (2):

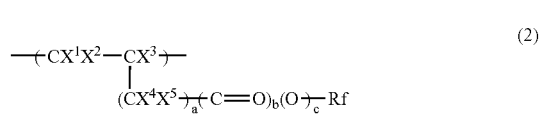   (2)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is a fluorine-containing alkylene group having 1 to 5 >C=O units and 1 to 50 carbon atoms excluding carbon atoms of >C=O units or a fluorine-containing alkylene group having ether bond which has 1 to 5 >C=O units and 2 to 100 carbon atoms excluding carbon atoms of >C=O units; a is 1, 2, or 3; b and c are the same or different and each is 0 or 1, the structural unit A is a structural unit derived from monomer copolymerizable with the structural unit M, and the structural unit M and the structural unit A are contained in amounts of from 0.1 to 100% by mole and from 0 to 99.9% by mole, respectively.

2. The fluorine-containing polymer of claim 1, wherein in the formula (1), the structural unit M is a structural unit M1 derived from a fluorine-containing ethylenic monomer and represented by the formula (3):

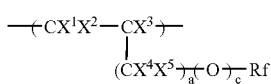   (3)

wherein $X^1$, $X^2$, $X^3$, $X^4$, $X^5$, Rf, a and c are as defined above.

3. The fluorine-containing polymer of claim 1, wherein in the formula (1), the structural unit M is a structural unit M2 derived from a fluorine-containing ethylenic monomer and represented by the formula (4):

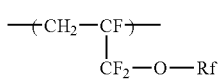   (4)

wherein Rf is as defined above.

4. The fluorine-containing polymer of claim 1, wherein Rf of said formula (2) is:

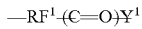

in which $Y^1$ is H, OH, $R^1$ or $OR^2$, wherein $R^1$ and $R^2$ are the same or different and each is a hydrocarbon group having 1 to 10 carbon atoms; $Rf^1$ is a fluorine-containing alkylene group having 1 to 50 carbon atoms or a fluorine-containing alkylene group having 2 to 100 carbon atoms and ether bond.

5. The fluorine-containing polymer of claim 1, wherein Rf of said formula (2) is:

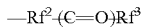

in which $Rf^2$ is a fluorine-containing alkylene group having 1 to 49 carbon atoms or a fluorine-containing alkylene group having 2 to 99 carbon atoms and ether bond; $Rf^3$ is a fluorine-containing alkyl group having 1 to 49 carbon atoms or a fluorine-containing alkyl group having 2 to 99 carbon atoms and ether bond; when $Rf^2$ is the fluorine-containing alkylene group and $Rf^3$ is the fluorine-containing alkyl group, a sum of carbon atoms of $Rf^2$ and $Rf^3$ is not more than 50 and when either of $Rf^2$ or $Rf^3$ is the fluorine-containing alkylene group having ether bond or the fluorine-containing alkyl group having ether bond, a sum of carbon atoms of $Rf^2$ and $Rf^3$ is not more than 100.

6. The fluorine-containing polymer of claim 1, wherein Rf of said formula (2) is:

in which $X^6$ and $X^7$ are the same or different and each is H or D (heavy hydrogen) or a halogen atom; $Y^1$ is H, D, OH, OD, $R^1$ or $OR^2$, wherein $R^1$ and $R^2$ are the same or different and each is a hydrocarbon group having 1 to 10 carbon atoms or a hydrocarbon group having 1 to 10 carbon atoms in which a part or all of hydrogen atoms are replaced with heavy hydrogens; $Rf^4$ is a fluorine-containing alkylene group having 1 to 49 carbon atoms or a fluorine-containing alkylene group having 2 to 99 carbon atoms and ether bond.

7. The fluorine-containing polymer of claim 1, wherein Rf of said formula (2) is:

in which $X^6$ and $X^7$ are the same or different and each is H or D (heavy hydrogen) or a halogen atom; $Rf^5$ is a fluorine-containing alkylene group having 1 to 48 carbon atoms or a fluorine-containing alkylene group having 2 to 98 carbon atoms and ether bond; $Rf^6$ is a fluorine-containing alkyl group having 1 to 48 carbon atoms or a fluorine-containing alkyl group having 2 to 98 carbon atoms and ether bond; when $Rf^5$ is the fluorine-containing alkylene group and $Rf^6$ is the fluorine-containing alkyl group, a sum of carbon atoms of $Rf^5$ and $Rf^6$ is not more than 49 and when either of $Rf^5$ or $Rf^6$ is the fluorine-containing alkylene group having ether bond or the fluorine-containing alkyl group having ether bond, a sum of carbon atoms of $Rf^5$ and $Rf^6$ is not more than 99.

8. The fluorine-containing polymer of claim 1, wherein Rf of said formula (2) is:

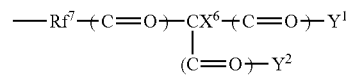

in which $X^6$ is H, D (heavy hydrogen) or halogen atom; $Y^1$ and $Y^2$ are the same or different and each is H, D, OH, OD, $R^1$ or $OR^2$, wherein $R^1$ and $R^2$ are the same or different and each is a hydrocarbon group having 1 to 10 carbon atoms or the hydrocarbon group having 1 to 10 carbon atoms in which a part or all of hydrogen atoms are replaced with heavy hydrogens; $Rf^7$ is a fluorine-containing alkylene group having 1 to 49 carbon atoms or a fluorine-containing alkylene group having 2 to 99 carbon atoms and ether bond.

9. The fluorine-containing polymer of claim 1, wherein Rf of said formula (2) is:

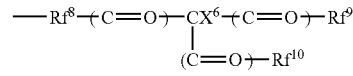

in which $X^6$ is H, D (heavy hydrogen) or halogen atom; $Rf^8$ is a fluorine-containing alkylene group having 1 to 48 carbon atoms or a fluorine-containing alkylene group having 2 to 98 carbon atoms and ether bond; $Rf^9$ and $Rf^{10}$ are the same or different and each is a fluorine-containing alkyl group having 1 to 48 carbon atoms or a fluorine-containing alkyl group having 2 to 98 carbon atoms and ether bond; when $Rf^8$ is the fluorine-containing alkylene group and both of $Rf^9$ and $Rf^{10}$ are the fluorine-containing alkyl groups, a sum of carbon atoms of $Rf^8$, $Rf^9$ and $Rf^{10}$ is not more than 49 and when any one or two of $Rf^8$, $Rf^9$ and $Rf^{10}$ are the fluorine-containing alkylene group having ether bond or the fluorine-containing alkyl group having ether bond, a sum of carbon atoms of $Rf^8$, $Rf^9$ and $Rf^{10}$ is not more than 99.

10. The fluorine-containing polymer of claim 1, wherein Rf of said formula (2) is:

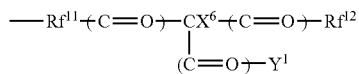

in which $X^6$ is H, D (heavy hydrogen) or halogen atom; $Y^1$ is H, D, OH, OD, $R^1$ or $OR^2$, wherein $R^1$ and $R^2$ are the same or different and each is a hydrocarbon group having 1 to 10 carbon atoms; $Rf^{11}$ is a fluorine-containing alkylene group having 1 to 48 carbon atoms or a fluorine-containing alkylene group having 2 to 98 carbon atoms and ether bond; $Rf^{12}$ is a fluorine-containing alkyl group having 1 to 48 carbon atoms or a fluorine-containing alkyl group having 2 to 98 carbon atoms and ether bond; when $Rf^{11}$ is the fluorine-containing alkylene group and $Rf^{12}$ is the fluorine-containing alkyl group, a sum of carbon atoms of $Rf^{11}$ and $Rf^{12}$ is not more than 49 and when either of $Rf^{11}$ or $R^{12}$ is the fluorine-containing alkylene group having ether bond or the fluorine-containing alkyl group having ether bond, a sum of carbon atoms of $Rf^{11}$ and $Rf^{12}$ is not more than 99.

* * * * *